United States Patent [19]

Lloyd

[11] Patent Number: 4,876,648

[45] Date of Patent: Oct. 24, 1989

[54] SYSTEM AND METHOD FOR IMPLEMENTING AND ADMINISTERING A MORTGAGE PLAN

[76] Inventor: Clarke B. Lloyd, 4710 N. Marine Dr., Ste. 23A, Chicago, Ill. 60613

[21] Appl. No.: 143,003

[22] Filed: Jan. 12, 1988

[51] Int. Cl.⁴ .......................... G06F 15/00; G06G 7/52
[52] U.S. Cl. ...................................... 364/408; 364/400
[58] Field of Search ........................ 364/408, 401, 400

[56] References Cited

U.S. PATENT DOCUMENTS

| | | | |
|---|---|---|---|
| 4,346,442 | 8/1982 | Musmanno | 364/408 |
| 4,742,457 | 5/1988 | Leon | 364/408 |
| 4,752,877 | 6/1988 | Roberts | 364/408 |

OTHER PUBLICATIONS

H. M. B., "Software Packages Assist Diverse Needs of Bond Portfolio Managers", *Wall Street Review*, Jun. 1985 pp. 61–65.

*Primary Examiner*—Jerry Smith
*Assistant Examiner*—Gail O. Hayes
*Attorney, Agent, or Firm*—Bernard L. Kleinke; Jerry R. Potts; William P. Waters

[57] ABSTRACT

A computerized mortgage implementing system includes a central service computer, which helps establish and maintain mortgage plans based upon mortgages at least partially collateralized by investment vehicles. Both a plurality of groups of investment vehicle information and mortgage information are stored in the service computer. Borrower information is entered in the service computer when a mortgage plan is to be established. An individual one of the groups of investment information is selected. A desired amount of the investment funding is determined for helping repay a mortgage plan. Mortgage implementing information is generated for a given mortgage plan, and is sent to a mortgage lender computer to facilitate the establishment of the mortgage plan.

43 Claims, 15 Drawing Sheets

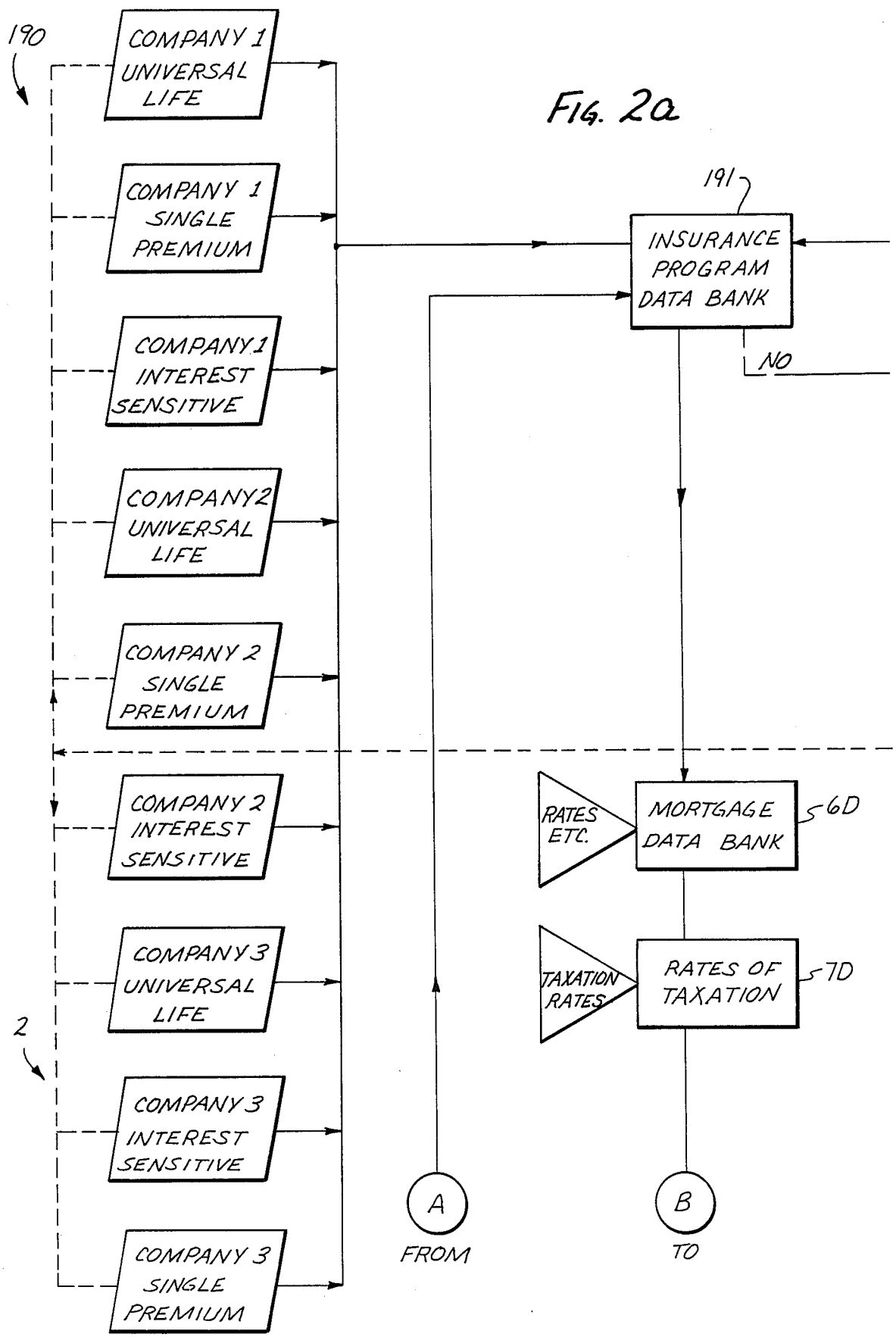

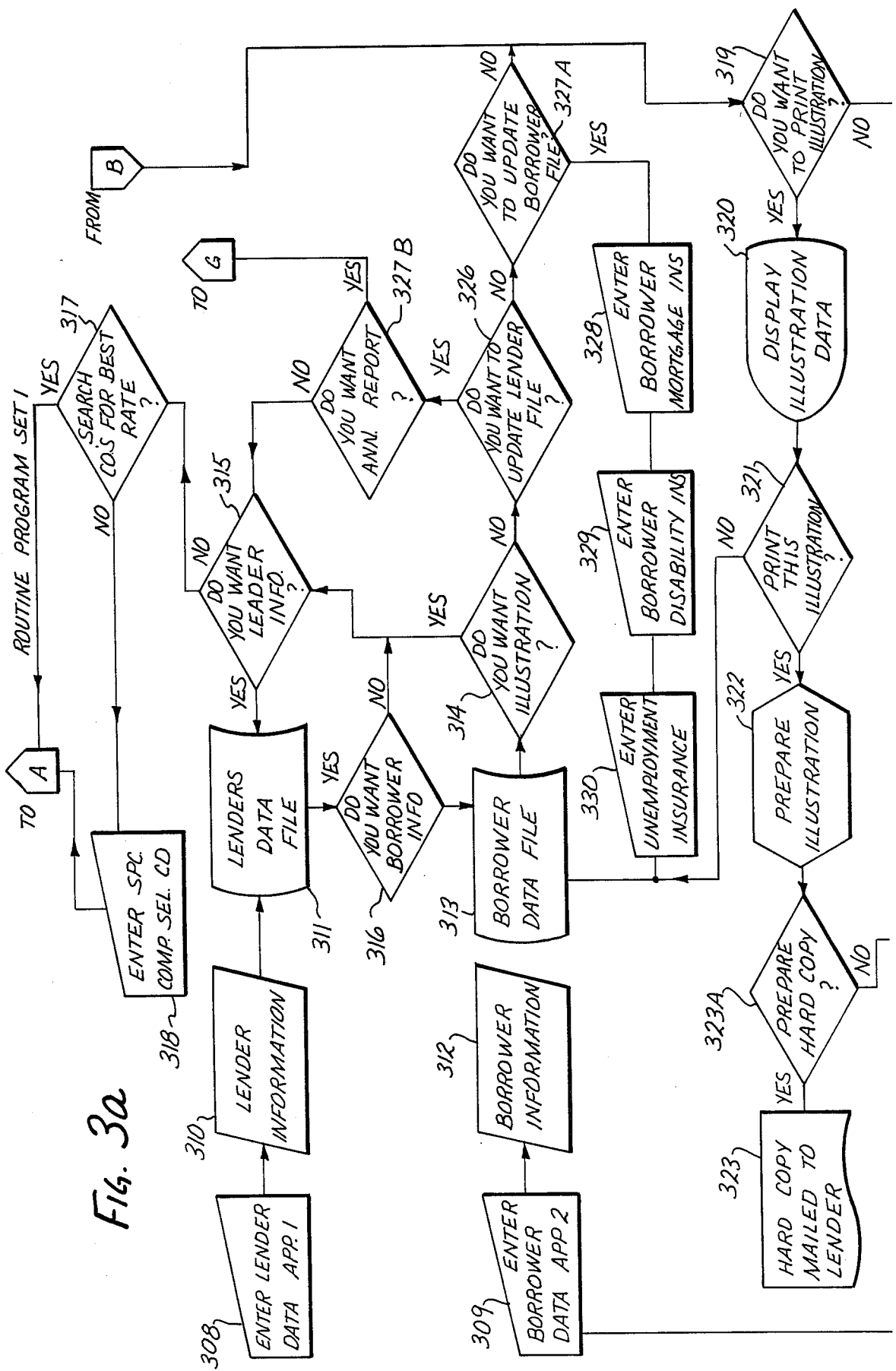

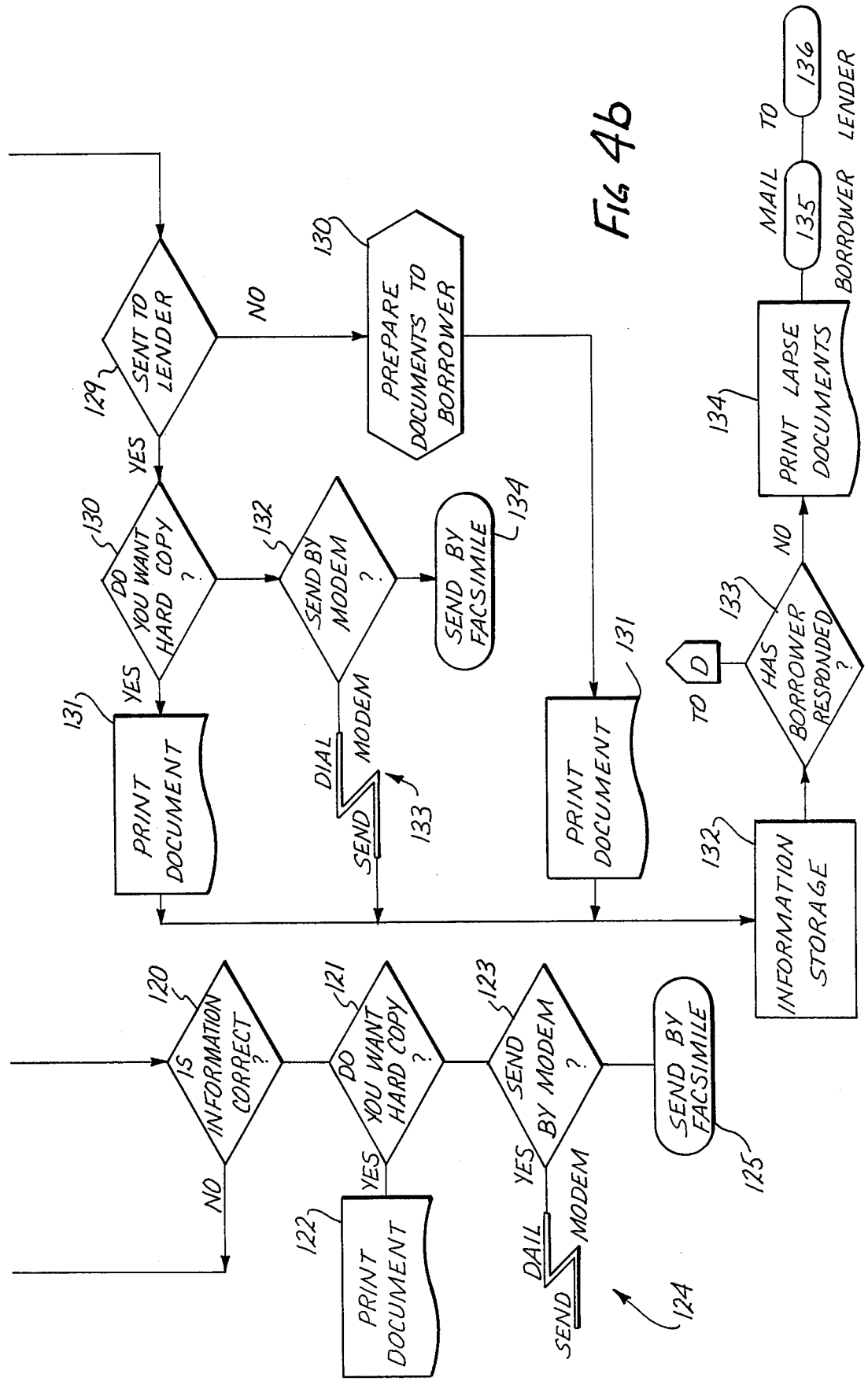

SYSTEM AND METHOD FOR IMPLEMENTING AND ADMINISTERING A MORTGAGE PLAN

TECHNICAL FIELD

The present invention relates in general to a computerized mortgage implementing system, as well as a method of operating it. More particularly, the present invention relates to a system and method of establishing and administering a mortgage plan, such as a residential mortgage plan.

BACKGROUND ART

There have been numerous types and kinds of residential mortgage plans used to facilitate the financing of real property, such as residential buildings. In this regard, a lender typically loans money to a borrower who is purchasing a residence, and the loan is collateralized pursuant to a mortgage plan, which includes a mortgage lien on the legal title to the residence. The legal terms and conditions of the mortgage plan have varied from time to time, but they have usually included payment provisions requiring the borrower to pay back the loan in equal monthly installments, wherein each installment includes a principal payment portion and an interest payment portion. In this regard, the monthly payments are made by the borrower over the length of the mortgage term, until the payments are made in full, or the mortgage is prematurely paid off.

One of the more significant problems associated with conventional mortgage plans, has been that the lending institution, such as a bank or savings and loan company, must agree to a certain interest rate for the loan over a long period of time, such as thirty years. Over such a substantial time interval, the current market interest rates can increase greatly over the interest rate specified in the mortgage plan. Thus, the loan institution may not receive an adequate return on its investment over the term of the mortgage plan. As a result, the lending institution can become financially impaired, where a large number of such mortgage plans have been implemented.

In an attempt to overcome this problem, adjustable rate mortgage plans have become popular. With such a plan, the interest rates fluctuate with certain interest indicators, such as government treasury bills, the prime interest rate, or others. However, such mortgage plans are not entirely popular with many borrowers, because the interest rates can increase substantially beyond a point where the amount of the mortgage payments far exceed the ability of the borrower to make the payments. Such a circumstance can easily occur, sometimes even in a sudden manner, where the borrower is not financially prepared for such large payments. As a result, the borrower is unable to make the mortgage payment, and the loan institution may foreclose on the mortgage. In such circumstances, a very unfortunate situation results for both the lending institution and the borrower.

In an attempt to provide a mortgage plan which overcomes these problems, it would be highly desirable to have a mortgage plan, which is of a type having a fixed interest rate to protect the borrower, and which enables the lending institution to be protected in the case of rising interest rates. In order to accomplish this, it would be well to have the mortgage plan include an investment vehicle, which is interest sensitive, and which is established and maintained primarily for the benefit of the lending institution. Thus, should interest rates rise, the borrower makes the same fixed interest payments, and the lending institution is protected by the interest sensitive investment vehicle. As a result, the investment vehicle partially collateralizes the loan.

However, in order to accomplish such an approach, the lending institution would necessarily be required to establish and monitor the investment vehicle over the life of the mortgage plan. Such monitoring on a periodic basis, such as a monthly basis, would not be readily feasible, nor practical, for a lending institution. In this regard, the lending institution is not in the business of monitoring such investments, and to include such an investment in the mortgage plan, would be an inordinate amount of work, and thus too great an expense to pass along to the borrower.

The work required to monitor the investment during the term of the mortgage, would be beyond the reasonable capabilities of the lender. Also, since it would be highly desirable to switch to different investment vehicles during the term of the mortgage, such capability would also be outside the ordinary and reasonable capabilities of most, if not all mortgage lending institutions.

Another highly desirable feature of such a residential mortgage plan, difficult or impossible to implement for most lenders, is the portability feature. With such a feature, the borrower can sell his or her real property, and purchase a new property by transferring the existing mortgage to the purchase of the new property. Such a series of transactions is too difficult to monitor by the lending institution, and thus a new mortgage is ordinarily established each time.

Therefore, it would be highly desirable to have a system which would facilitate the establishment and ongoing administration of a mortgage plan, which is partially collateralized with an investment vehicle, in such a manner that the lending institution is not overly burdened with expense and time relating to such an elaborate and desirable mortgage plan. Such a new mortgage plan should be or able to be implemented, such that the investment vehicle can be monitored conveniently, and even switched subsequently for a more advantageous one. Also, such a system should facilitate the implementation and administration of a mortgage plan which would provide advantages for the borrower, as compared to conventional mortgage plans. For example, the after tax cost should be less as compared to existing mortgages, and such a new plan should enable the mortgage to be portable for the borrower, without undue expense and burden to the lender.

DISCLOSURE OF THE INVENTION

Therefore, the principal object of the present invention is to provide a new and improved method and apparatus for implementing a mortgage plan, whereby a mortgage of the mortgage plan is partially collateralized by an interest sensitive investment vehicle, without undue expense and involvement on the part of the lending institution.

Another object of the present invention is to provide such a new and improved method and apparatus which assist in the selection of the investment vehicle, and which facilitate both the implementation and maintenance of the mortgage plan.

Briefly, the above and further objects of the present invention are realized by providing a new and improved method and apparatus for facilitating the implementation of an investment vehicle to collateralize partially a mortgage loan, and for helping establish and maintain such a mortgage plan, over the life thereof.

A computerized mortgage implementing system includes a central service computer, which helps establish and maintain mortgage plans based upon mortgages at least partially collateralized by investment vehicles. Both a plurality of groups of investment vehicle information and mortgage information are stored in the service computer. Borrower information is entered in the service computer when a mortgage plan is to be established.

An individual one of the groups of investment information is selected. A desired amount of the investment funding is determined for helping repay a mortgage plan. Mortgage implementing information is generated for a given mortgage plan, and is sent to a mortgage lender computer to facilitate the establishment of the mortgage plan.

In this manner, by having a central service computer, all of the establishment functions can be performed by the central service computer, and the maintenance of the mortgage can also be provided as a service to the lending institution. Additionally, the service computer is used for the benefit of the borrower by enabling the service computer to determine the most preferred investment vehicle such as an insurance policy, or an elected investment vehicle. If desired, the most preferred lending institution for a given borrower can be selected, or an elected lender can be selected.

Thus, since the common service computer can perform similar complex functions for a large number of companies, a financial savings is realized by the lending institution, when implementing and administering such a complex hybrid mortgage plan. The financial savings are passed onto the borrower. The lending institution is protected by the interest sensitive investment vehicle, which is established at least partially for the benefit of the lender to protect it in the face of rising interest rates. Additionally, the borrower can realize numerous advantages, and features, such as mortgage portability, as well as having a portion of the mortgage loan repaid from the investment vehicle.

The complex calculations required for such a hybrid mortgage plan, being coupled with an investment vehicle, to protect the lending institution in the face of rising interest rates, is achieved by the system of the present invention. In this regard, a mortgage plan can be initiated by having a borrower either contact the service company, or by having a borrower contact one of the lending institutions having a computer, which is a part of the system. In either access mode, the service computer performs all of the necessary calculations for the implementation and administration of the desired mortgage agreement.

Thus, the system of the present invention enables a group of lending institutions to utilize all of the computing capabilities of the common service computer, at a relatively low cost to the lending institution. In this regard, the lending institution does not require constant updating and evaluation of various investment vehicles to collateralize partially the novel type of mortgage plan.

The lending institution is protected against the rising interest rates, since the investment vehicle is interest sensitive and is used for the benefit of the lending institution, as well as the borrower, in the event of rising interest rates. In this regard, the preferred form of the investment vehicle is a universal life insurance policy owned by the lender, on the life of the borrower. With such an investment vehicle, when interest rates rise, the additional interest income earned by the cash value of the insurance policy, is paid by the insurance company to the lender to compensate for the lower fixed interest rate of the mortgage plan.

Additionally, the lender can borrow against the accumulated cash value, and, in turn, loan the borrowed money to its customers at a profit to the lender. Thus, the lender is protected by the cash value, and its book assets are increased by the cash value.

BRIEF DESCRIPTION OF THE DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

The following detailed description is organized and arranged according to the following outline:
(A) SYSTEM HARDWARE
(B) SYSTEM OPERATION
(C) MORTGAGE PLAN
(D) SYSTEM COMPUTER SOFTWARE
  (D1) INSURANCE DATA COMPILATION
  (D2) SINGLE AND ANNUAL PREMIUM INTEREST SENSITIVE WHOLE LIFE
  (D3) THE MORTGAGE DATA BANK
  (D4) THE TAX BASE DATA BANK
  (D5) INDIVIDUAL ROUTINE FOR SINGLE COMPANY DATA BANK The detailed description will commence with a description of the system hardware.

(A) SYSTEM HARDWARE

Figure 1:
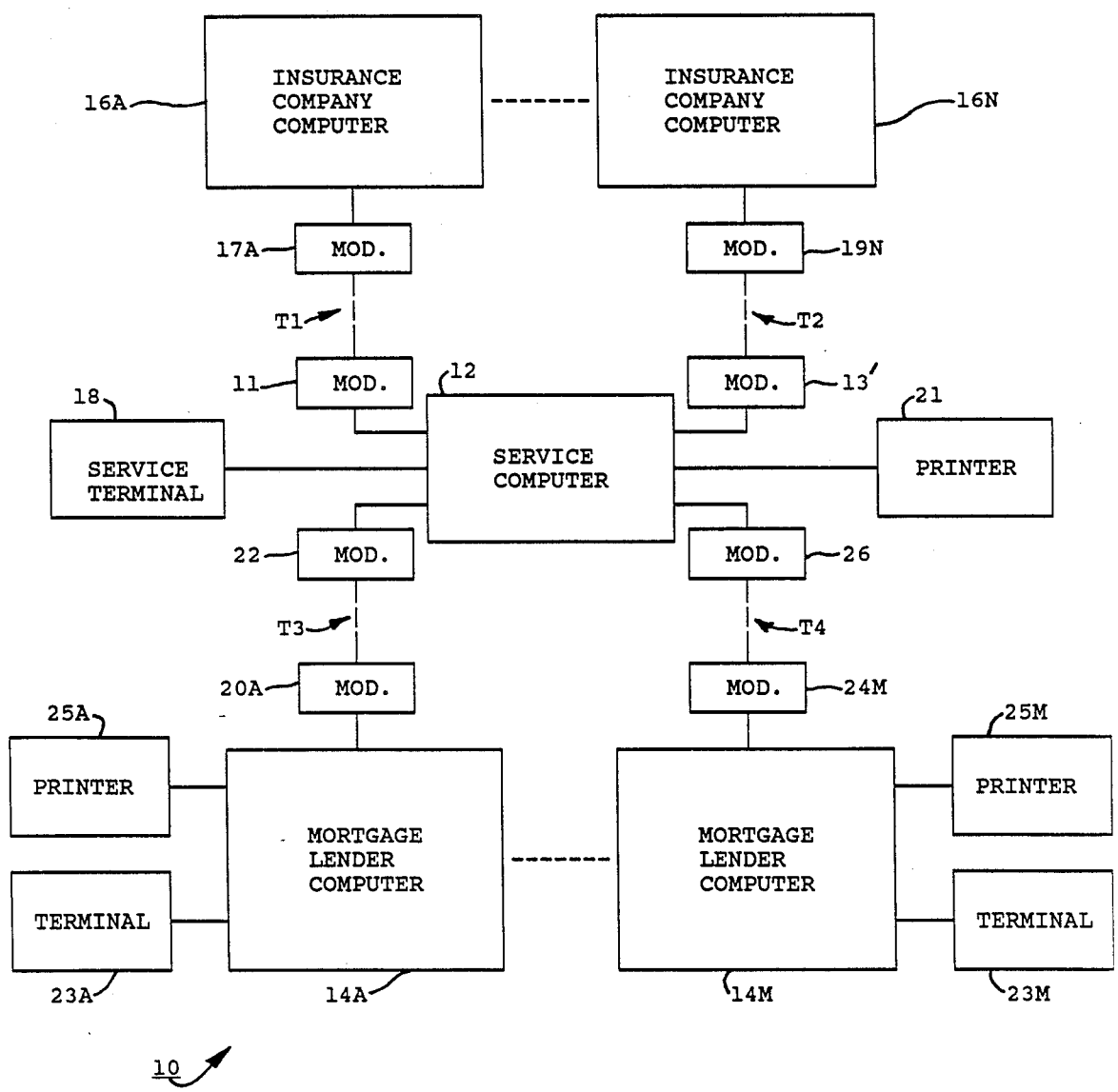
FIG. 1 is a block diagram of a mortgage implementing system, which is constructed in accordance with the present invention.

Referring now to FIG. 1, there is shown a mortgage implementing system 10, which is constructed in accordance with the present invention. The system 10 enables a new hybrid mortgage plan to be implemented in such a manner that an investment vehicle, such as a universal life insurance policy, can be integrated into, and form a part of, the mortgage plan to collateralize it partially.

While it should be understood that a life insurance policy, such as a universal life policy, is the preferred investment vehicle in accordance with the present invention, other types and kinds of life insurance policies may also be employed for different mortgage plans and borrowers. For example, as hereinafter explained in greater detail, annual premium interest sensitive ordinary life insurance agreements, or whole life insurance agreements, may also be employed. Other types and kinds of investment vehicles may also be employed, as will become apparent to those skilled in the art upon a review of the disclosure of this invention.

The system 10 generally comprises a service computer 12, which communicates interactively with a plurality of lender computers 14A through 14M. It should be understood that any number of such lender computers may communicate with the service computer 12. Similarly, a group of insurance company computers 16A through 16N communicate interactively with the service computer 12. A service terminal 18 and a printer 21 are connected in communication with the service computer 12. In this regard, the service terminal 18 enables customer information to be entered and stored in the service computer and to be communicated therefrom to a selected one of the lender computers. The service printer 21 is used to print out reports, as hereinafter described in greater detail.

A lender terminal 23A communicates with the lender computer 14A, and in this regard, each lender computer has its own terminal and printer. In this regard, a lender terminal 23M communicates with the lender computer 14M, and the computer 14M is used to drive the printer 25M for the lending company.

It is to be understood that the service computer, as well as each one of the other computers, may be located on geographically different located premises. In this regard, each one of the insurance company computers, the lending company computers, and the service computer are located at different geographical locations. The computers communicate with one another via modems, or other suitable means of communication. Alternatively, information can be stored in various different forms of memory media, such as floppy disks, and physically transported to the receiving computer.

(B) SYSTEM OPERATION

In operation, assume that a prospective borrower is interested in obtaining the mortgage plan, which is implemented by the system 10, and the borrower goes to the lending company having the computer 14A. Personnel of the lending company operate the terminal 23A to input certain customer data concerning the amount of the loan, personal information regarding the customer and other such information, as hereinafter described in greater detail. This information is sent via a computer modem 20A over a telephone line T3, to another modem 22 at the service company. In this manner, the lending company computer terminal 23A can access interactively the service company computer 12. In this regard, the customer information is transferred to the service computer 12, Wherein calculations are performed to determine the most appropriate investment vehicle, as well as to calculate the various payments which would be necessary for implementing the mortgage plan for the borrower.

Once this information has been generated, the computer 12 sends the necessary information to the lending company computer 25A for generating a report from the lending company computer printer 25A. This report is used to inform the prospective borrower as to the various advantages of investing in the system mortgage plan.

The service computer 12 subsequently helps in the implementation of the mortgage plan, by enabling various documents to be printed via the printer 25A in response to messages sent from the service computer 12 to the lending company computer 14A.

The mortgage plan is thereafter administered on an ongoing basis over the life of the mortgage under the control of the service computer 12. In this regard, the service computer 12 sends information to both the appropriate lending company computer 14A and the mortgage company computer to provide necessary reports.

The new computer program and hardware system 10 permit the close supervision of each account up to one hundred years.

The lenders and insurance companies each have a modem connected to its computer to communicate with the service computer 12.

The service company includes a group of modems, such as the modems 11 and 13A, which communicate over suitable communication links, such as telephone lines T1 and T2, to modem 17A of the insurance company computer 16A and modem 19N of the insurance company computer 16N, respectfully. Similarly, a group of service computer modems, such as modems 22 and 26 communicate over telephone lines T3 and T4 with modem 20A of the lender computer 14A and modem 24M of the lender computer 14M, respectfully.

Each modem contains a distinct "access code" that cannot be duplicated without the modem hardware (not shown). This code permits a free flow of information between the lender and insurance company computers, and the main service computer 12 on customers of the lender which cannot be accessed by other lenders.

Communications can be transmitted to a computer modem, a facsimile recorder (not shown) or via telex (not shown). Hard copy printed at the central service company office may be mailed to the correspondent lender.

The lender can obtain personalized quotations or illustrations for system mortgages and conventional mortgages at which time the customer will receive a customer code number which is identified with the lender and remains with the customer until his or her death if a system mortgage is elected. If the system mortgage is not elected, each lender is notified in ninety days that the assigned customer code will be cleared due to inactivity. A further sixty days will remain for the lender to permit the code to be cleared or request that the code be continued.

After a system mortgage is placed in effect, the quotation file is updated to include the details of the mortgaged property, the mortgage amount, the monthly payment, the amount held in escrow for taxes, the amount of life insurance, the name and address of the insurance carrier, the model premium of the insurance, the other purchases made by the borrower to be paid through the mortgage payment, such as employment insurance, mortgage life insurance, and disability insurance. It records the companies with whom coverage is placed, the premium requirements, proof of premium payment. Details of changes in the mortgaged property assignments, financing, interest alterations are recorded on a daily basis when advised by the lender. These changes trigger responses in detailed changes in insurance and other supporting documents. Any change in plan, company, beneficiary or premium is recorded for the life of the policyholder or the life of the policy whichever is less.

The program also records the name of the insurance carrier and assignment for the fire, property and casualty coverages, which would be triggered if any change occurs in the mortgage document.

When the mortgage is sold or transferred to another lender, all of the documentation is searched and the preassignment procedures are automatically set in motion, and followed up every ten days. When the companies complete the documentation, it is recorded in the lender/borrower file.

The financial status of the mortgage payments (and other required payments) are searched and recorded monthly, as they impact on the availability of the option in the future. A monthly report is sent to each institution showing the status of each customer account as reported by the lender and recorded by the computer. It also shows the cash value available by account and if the lender has borrowed against the cash value. It shows the amount borrowed, interest due, etc. It also records the face amount of the insurance in force. The information is summarized and totaled.

The program also transfers accounts and account information from one lender to another when the mortgage has been sold through the secondary mortgage market. It records the lender who owns the mortgage and the servicing agent. The servicing agent can be either the originating lender (even though it sold the mortgage), or the transfer lender in the secondary mortgage market, either approach being possible with present conventional mortgages.

At that point, the borrower's files are transferred to the new lender and are removed from the original lender. If the original lender continues to service the account, it receives the information coded as a servicing agent from the service computer 12.

The servicing agent file records payments on accounts and the individual and accumulated servicing fees received. The servicing agent is kept aware of the assignment of policies and the details on their current status. However, the servicing agent does not receive details on the status of the life insurance (other than the recording of timely premium payments by the borrower). It does not receive a statement of interest earned, whether or not the lender has borrowed the cash values or any details of interest only to the lender.

Periodically, the program prints timely tax information for both the lender and the borrower. The borrower receives within the first two weeks of January each year, a financial report on his or her mortgage. This shows the total payments made, the total interest charged, the premiums paid on elected coverages such as disability, mortgage life insurance, employment guarantee insurance etc. It does not show the premiums paid or any other status regarding the lender owned insurance coverage. This information is retained only by the lender.

As a feature of the new hybrid plan to benefit the borrower, a feature of the mortgage plan, referred to as the Cost Containment Option, enables the borrower to pay off the mortgage at certain specified intervals of time during the duration of the mortgage, and receive a substantial sum of money. The money is paid to the borrower, if the option is exercised only during the fifth, tenth, fifteenth, etc. years of the mortgage, and if the borrower had a good history of payments on the mortgage.

Within sixty days of the cost containment option dates, the lender is notified by a suitable message sent from the service computer 12 to the lender computer, stating that an option data is due. Thirty days prior to the date, the program sends a notice of the option and then choices that are available to the borrower by registered mail. It also states the deadline for the borrower to exercise the option. The option notice shows the outstanding mortgage, the value of the option, the cash surrender value, the amount that would be required in addition to the cash surrender value to discharge the mortgage. The notice includes a power of attorney for the service company to hold all funds in escrow during the discharge of the mortgage. The borrower responds by electing his or her option at which time the lender is notified. When the borrower passes his or her option date, the program notifies the borrower that the option date has passed, and the date of the next option.

When a change in the interest rate is announced by an insurer on the life insurance policy supporting a mortgage, the lender receives a statement which shows the cash value currently credited to date (which is already earned) and projects the plan on the new interest rate for the balance of the mortgage period. This is provided on an individual account and an account summary which permits the lender to project his or her current and future asset and available funds base.

At the pre-determined period certain (final option) for the property exchange (i.e., 10 year, 20 year, 30 year), the system 10 automatically notifies all parties of the exchange. The notices are forwarded for completion by the lender and the borrower, and includes a copy of the original agreements. These documents include:

1. Temporary power of attorney between the lender and the service company;
2. Temporary power of attorney between the borrower and the service company; and
3. Temporary power of attorney between the insurer and the service company.

The funds for the various transfers are held in escrow until all the documentation have been completed to permit the transfer of the insurance policy; to obtain the required policy loan for the transfer of the outstanding mortgage amount; and to obtain the required policy loan to pay the required taxes on the cost containment option. When the funds are transferred to the various accounts and all of the release forms and policy loan forms are completed, the document transfer takes place, and the funds are distributed.

The borrower information is removed from the lender's file, and the borrower is serviced as a life insured in a separate file. He or she receives an annual report status on his or her insurance policy which provides the required information on the policy loan, the current cash value, the interest credited to the unimpaired cash value, the interest credited to the impaired cash value and the loan interest charged.

This information is provided until the death of the insured. The death benefit which may be in excess of the policy loan, is paid to the beneficiary of the policy owner as recorded when the policy is purchased from the lender.

(C) MORTGAGE PLAN

Considering now the new mortgage plan implemented by the system 10 in greater detail, the new hybrid plan is primarily intended as a residential mortgage plan. However, it may also be employed in connection with certain types and kinds of commercial mortgages as well. The mortgage plan integrates the conditions of a fixed rate mortgage with additional security provided by an investment vehicle, such as a universal life policy. In this regard, the additional security is afforded by the cash value accumulations within a universal life insurance policy, which is owned by the lending company and under its control.

Under the terms and conditions of the mortgage plan, the borrower repays the mortgage on an interest only basis, over the term of the mortgage loan when coupled with the accumulation of cash values in the life insurance policy written by the life insurance company employing one of the computers 14A through 14M. The life insurance policy is issued by the insurance company in an amount calculated by the service computer 12 and equal to the principal amount of the mortgage plus an additional sum as hereinafter described in greater detail. The life insurance policy is coextensive with the term of the mortgage portion of the mortgage plan.

The insurance policy is owned by the lender, and is the beneficiary of the policy. The lender is responsible for the annual payment of the life insurance premium. Upon completion of the term of the mortgage, or at the time the property is sold, the lender sells the policy to the borrower; who then applies for the cash value to repay the lender for the outstanding principal amount of the mortgage. It should be noted that at the time the borrower receives the policy, the lender restores the current accumulated cash value by repaying any outstanding loans thereagainst. However, the lender will be repaid, at this time, the total amount of the mortgage (100% of the principal), by the borrower.

If the accumulated cash values are not sufficient to repay the unpaid principal mortgage amount at the time of the sale, the borrower is permitted to access the sale proceeds of the property to pay the difference to the lender.

Subject to the lender's agreement, the borrower may exercise a portability option to transfer the existing interest-only mortgage from one property location to another location at an increased, similar, or reduced mortgage amount. Underwriting approval of the new property requires verification of the continuing credit worthiness, appraised property value, and proof of the current good health of the borrower. In the event of a change in the required mortgage amount of the subsequent property purchase, the borrower agrees to modify the insurance coverage to reflect the principal amount of the new mortgage and recast the interest rate to the current interest rate at that time.

Since the lending company owns the life insurance policy on the life of the borrower, there are provisions of the lender to be protected, even if the borrower should die before the loan is retired. In this regard, should the borrower die, at that time, the lender receives a policy face amount payment from the insurance company to replace the cash value of the policy. In this regard, upon the death of the borrower, the cash value of the policy is replaced by the face amount of the policy. Thus, the lender continues to be protected, even in the absence of the cash value. This is especially important where the real property declines in value, and/or the interest rates have risen substantially. Thus, the lender continues to be protected, despite the death of the borrower. Also, an option is provided to protect two or more co-borrowers in the event of death of the other.

The mortgage plan includes the unique cost containment clause, wherein the borrower may exercise an option to pay off the principal balance of the mortgage at certain intervals of time during the mortgage term. In this regard, every five years, the borrower is permitted to exercise the cost containment clause. If the cost containment clause option is exercised, the lender pays a bonus amount of money to the borrower, based upon a history of prompt payments as defined in the mortgage and note documentation. The amount of the bonus represents a portion of the interest paid over the term of the mortgage.

The cost containment clause enables the borrower to have the following options:

(a) Keeping the cash payment;

(b) applying the payment to reduce the principal amount of the mortgage; and (c) applying the payment to the purchase of the universal life policy owned by the lender. If the amount of the cost containment clause bonus is insufficient, the borrower must pay the additional amount. The sale value of the policy is the total amount of the insurance premiums which have been paid by the lender.

One of the important advantages of the mortgage plan is the protection of the lender against rising interest rates. In this regard, over the term of a mortgage, the interest rates can rise substantially, to the detriment of the lender. However, with the unique mortgage plan of the present invention, the lender is the owner and beneficiary of a life insurance policy, which insures the life of the borrower. As such, the lender controls the annual accumulation of increasing cash values in the life insurance policy obtained on the life of the borrower to enhance the security of the mortgage. However, the cash value is interest sensitive, and therefore, as interest rates rise, the accumulations increase proportionally. As a result, the lender is protected by the investment vehicle in the form of the life insurance cash value, since the lender receives the additional earned interest on the accumulated cash value, and since the lender can borrower continuously against the cash value.

Additionally, the lender is, of course, protected by the secured first mortgage loan position, as in the case of a conventional mortgage. Additionally, the accumulating cash values in the insurance policy provides access to the immediate funding of monthly forbearance payments for borrowers suffering a period of financial stress. In this regard, the cash values enable the payments to be made, even if the borrower is unable to make the payments, as a result of unemployment, or the like.

The mortgage plan also assures the lender of immediate repayment of the principal amount of the mortgage in the The mortgage plan also creates a vehicle which permits the lender to transfer its first lien position from one property location to another, in principal amounts which may be higher, the same, or lower than the original mortgage amount, by simply adjusting the amount of the insurance coverage to equal the new mortgage amount. The lender grants underwriting approval subject to the borrower's ongoing credit worthiness, appraised value of the property, the health of the borrower, and recasting of the interest rate to the current rate of interest.

Considering now the benefits afforded to the borrower, the mortgage plan reduces the borrower's after-tax out-of-pocket expenses for the mortgage over the mortgage term. For example, over a thirty year mortgage term, there can be an after-tax savings of as much as 33%, as compared to the repayment of principal and interest for a conventional mortgage. Additionally, the annual increase in the accumulating cash value of the policy accelerate at a rate faster than the reduction of the mortgage principal and the repayment of a conventional principal and interest mortgage.

Subject to the lender's approval, the mortgage plan may be transferred from one location to another at the mortgage amount levels which may be higher, the same, or lower than the original mortgage amount, without requiring the borrower to pay additional mortgage loan originating fees. Therefore, there are numerous advantages for the borrower, as well as the lender, in connection with the mortgage plan.

In order to illustrate some of the benefits of the plan, an example will now be considered. We will assume that the borrower is attempting to borrow $100,00, and is willing to mortgage the real property in that amount. Assume that a conventional fixed interest rate mortgage currently has an interest rate of 10.5% for a thirty-year term.

Considering the conventional fixed-interest rate mortgage for comparison purposes, the monthly payment is $914.74 each month for thirty years. The following is Table 1, which illustrates the costs involved:

It can be seen from Table 1 that the month)y payments remain constant, and include both principal and interest portions. As a result, the principal amount of the loan is reduced as indicated in the table. The annual after tax cost of the conventional mortgage loan is shown in Table 1, based upon an assumption that the primary borrower is in the current 33% federal income tax bracket, and thus, the borrower's actual cost after taxes is illustrated. In this regard, it is assumed that the borrower is currently able to receive a tax advance for the interest payments made on his or her residential mortgage. It should be noted that the total after tax cost for the thirty years is $302,132.20.

For comparison purposes, the following is a table which illustrates a mortgage plan implemented by the system 10 for the same $100,000.00 loan at a higher interest rate of 11.5% per annum, as follows:

TABLE 1

CONVENTIONAL MORTGAGE
30 YEAR TERM/10.5% PER ANNUM FIXED

| YEAR | MONTHLY PAYMENT | OUTSTANDING PRINCIPAL | ANNUAL REDUCTION OF PRINCIPAL | ANNUAL AFTER TAX COST |
|---|---|---|---|---|
| 1 | 914.74 | 99,499.49 | 500.51 | 7,764.41 |
| 2 | 914.74 | 98,943.02 | 556.47 | 7,810.19 |
| 3 | 914.74 | 98,326.92 | 616.10 | 7,858.54 |
| 4 | 914.74 | 97,642.02 | 684.90 | 7,915.43 |
| 5 | 914.74 | 96,881.68 | 760.34 | 7,977.20 |
| 6 | 914.74 | 96,037.52 | 844.16 | 8,045.87 |
| 7 | 914.74 | 95,100.35 | 937.17 | 8,122.04 |
| 8 | 914.74 | 94,059.90 | 1,040.45 | 8,206.63 |
| 9 | 914.74 | 92,904.76 | 1,155.14 | 8,300.56 |
| 10 | 914.74 | 91,622.33 | 1,282.46 | 8,404.86 |
| 11 | 914.74 | 90,198.61 | 1,423.69 | 8,520.48 |
| 12 | 914.74 | 88,617.94 | 1,580.67 | 8,649.07 |
| 13 | 914.74 | 86,863.07 | 1,754.87 | 8,791.76 |
| 14 | 914.74 | 84,914.82 | 1,948.25 | 8,950.12 |
| 15 | 914.74 | 82,751.86 | 2,162.96 | 9,125.47 |
| 16 | 914.74 | 80,350.55 | 2,401.31 | 9,321.18 |
| 17 | 914.74 | 77,684.60 | 2,665.95 | 9,537.91 |
| 18 | 914.74 | 74,724.85 | 2,959.75 | 9,778.54 |
| 19 | 914.74 | 71,438.94 | 3,285.91 | 10,045.64 |
| 20 | 914.74 | 67,790.90 | 3,648.04 | 10,342.2 |
| 21 | 914.74 | 63,740.83 | 4,050.07 | 10,671.51 |
| 22 | 914.74 | 59,244.42 | 4,496.41 | 11,037.06 |
| 23 | 914.74 | 54,252.49 | 4,991.93 | 11,442.90 |
| 24 | 914.74 | 48,710.45 | 5,542.04 | 11,893.43 |
| 25 | 914.74 | 42,557.65 | 6,152.80 | 12,393.64 |
| 26 | 914.74 | 35,726.79 | 6,830.86 | 12,948.99 |
| 27 | 914.74 | 28,143.17 | 7,583.62 | 13,565.98 |
| 28 | 914.74 | 19,723.78 | 8,419.39 | 14,249.98 |
| 29 | 914.74 | 10,376.55 | 9,347.23 | 15,009.88 |
| 30 | 914.74 | 0.00 | 10,376.55 | 15,450.68 |
| | | | | 302,132.20 |

TABLE 2

SYSTEM MORTGAGE
30 YEAR TERM/11.5% PER ANNUM FIXED

| YR. | MONTHLY PAYMENT | OUTSTAND. PRINCIPAL | ANNUAL AFTER TAX COST | ACCUM. COST CONTAIN. OPTION VALUE | ACCUM. CASH SURREND. VALUE FOR EXCHANGE |
|---|---|---|---|---|---|
| 1 | 958.34 | 100,000 | 7,705 | 0 | 0 |
| 2 | 958.34 | 100,000 | 7,705 | 0 | 0 |
| 3 | 958.34 | 100,000 | 7,705 | 0 | 0 |
| 4 | 958.34 | 100,000 | 7,705 | 0 | 0 |
| 5 | 958.34 | 100,000 | 7,705 | 5,000 | 3,212 |
| 6 | 958.34 | 100,000 | 7,705 | 0 | 0 |
| 7 | 958.34 | 100,000 | 7,705 | 0 | 0 |
| 8 | 958.34 | 100,000 | 7,705 | 0 | 0 |
| 9 | 958.34 | 100,000 | 7,705 | 0 | 0 |
| 10 | 958.34 | 100,000 | 7,705 | 10,000 | 10,477 |

TABLE 2-continued
SYSTEM MORTGAGE
30 YEAR TERM/11.5% PER ANNUM FIXED

| YR. | MONTHLY PAYMENT | OUTSTAND. PRINCIPAL | ANNUAL AFTER TAX COST | ACCUM. COST CONTAIN. OPTION VALUE | ACCUM. CASH SURREND. VALUE FOR EXCHANGE |
|---|---|---|---|---|---|
| 11 | 958.34 | 100,000 | 7,705 | 0 | 0 |
| 12 | 958.34 | 100,000 | 7,705 | 0 | 0 |
| 13 | 958.34 | 100,000 | 7,705 | 0 | 0 |
| 14 | 958.34 | 100,000 | 7,705 | 0 | 0 |
| 15 | 958.34 | 100,000 | 7,705 | 15,000 | 22,022 |
| 16 | 958.34 | 100,000 | 7,705 | 0 | 0 |
| 17 | 958.34 | 100,000 | 7,705 | 0 | 0 |
| 18 | 958.34 | 100,000 | 7,705 | 0 | 0 |
| 19 | 958.34 | 100,000 | 7,705 | 0 | 0 |
| 20 | 958.34 | 100,000 | 7,705 | 20,000 | 40,648 |
| 21 | 958.34 | 100,000 | 7,705 | 0 | 0 |
| 22 | 958.34 | 100,000 | 7,705 | 0 | 0 |
| 23 | 958.34 | 100,000 | 7,705 | 0 | 0 |
| 24 | 958.34 | 100,000 | 7,705 | 0 | 0 |
| 25 | 958.34 | 100,000 | 7,705 | 25,000 | 70,782 |
| 26 | 958.34 | 100,000 | 7,705 | 0 | 0 |
| 27 | 958.34 | 100,000 | 7,705 | 0 | 0 |
| 28 | 958.34 | 100,000 | 7,705 | 0 | 0 |
| 29 | 958.34 | 100,000 | 7,705 | 0 | 0 |
| 30 | 958.34 | 100,000 | 7,705 | 30,000 | 120,000 |
|   |   |   | 231,150 |   |   |

The Table 2 illustrates that the borrower makes no payments toward principal, and the entire fixed monthly payment of $958.34 is used toward the interest on the mortgage loan. It is also further assumed that the borrower is able to receive a tax advance for the interest payments. It should be noted that the total annual after tax cost to the borrower is $231,150 for the entire thirty year term of the mortgage. This represents a savings, over a conventional fixed term mortgage, of $70,982.20. It should also be noted that the annual after tax cost for each year of the mortgage plan implemented by the system 10, is less than the corresponding annual after tax cost of the conventional mortgage for each year. In this regard, the annual after tax cost year is $7,705, which is less than the annual cost of the conventional mortgage for each year thereof. Thus, the borrower realizes a very substantial after tax savings for the mortgage plan of the present invention, for each year of the mortgage.

From the borrower's perspective, there is an additional advantage as evident from Table 2. In this regard, every five years, starting with the fifth year, the borrower may exercise the cost containment option of the mortgage plan of the present invention. A bonus in the amount of $5,000 for the first five years, and an additional $5,000 for each five years thereafter, is paid by the lender to the borrower, should the borrower decide to pay off the mortgage. This bonus is an incentive for the borrower to make timely payments on the mortgage plan. Such timely payments, of course, also benefits the lending company.

Considering now the economic advantages to the lending company with reference to Table 2, as mentioned previously the lender realizes substantial economical advantages. Even if the mortgage plan is terminated at an early date, the lender realizes a higher level of income, as compared to a conventional fixed interest rate mortgage. For example, should the cost containment option be exercised by the borrower at the first five year interval, the lending company must pay the borrower $5,000. The accumulated cash surrender value of the life insurance company is then paid to the lending company, in the amount of $3,212.00.

Under such early termination of the mortgage, the lending company realizes a net profit of $1,564 over the conventional mortgage illustrated in Table 1. A calculation of that net profit as compared to a conventional mortgage, is shown in the following Table 3:

TABLE 3
LENDER PROFIT OVER CONVENTIONAL
(5 YEAR TERMINATION)

| | |
|---|---|
| $57,506 | System mortgage interest earned for 5 yr. |
| −51,584 | Conventional interest earned 5 yr. |
| −5,000 | Cost containment paid borrower |
| +3,212 | Ins. co. paid lender/cost |
| $ 4,128 | containment from cash value |
| −2,564 | Insurance premiums paid by lender |
| $ 1,564 | Net profit over conventional mortgage |

As shown in the above Table 3, due to the higher interest rate of an additional 1%, the inventive mortgage plan realizes a net profit of $1,564 over a conventional mortgage, even though the cost containment and the insurance premiums are paid by the lender under the inventive hybrid mortgage plan.

Thus, even in the present example of an early termination, the lending company realizes a profit over a conventional fixed term mortgage. Such a profit may even be greater in subsequent years, as the cash value accumulates.

The most significant advantage of the inventive mortgage plan to the lender, is the protection against rising interest rates. Should interest rates rise over the term of the inventive mortgage, the investment vehicle in the form of the interest sensitive life insurance policy, provides a growing fund of money for the lender. The fund grows with increasing interest rates, and the lender receives the additional interest in excess of an interest income predetermined by the service computer 12. Additionally, the lender has the right to borrow continuously against the accumulated cash value. Also, the accumulated cash value is considered to be an asset of the lending institution.

The object of the mortgage plan is to provide a loan secured by a mortgage to a borrower at either fixed or adjustable interest rates, without the requirement of making principal payments at anytime. With a one time exception, as hereinafter mentioned in greater detail, all payments made by the borrower may be tax deductible on the borrower's federal income tax return, as interest on a mortgage loan.

The plan is designed to be so flexible that the mortgage, originated through a primary lender, can be sold to an indefinite number of lenders in a secondary mortgage market through the sale of any number of mortgages from one lender to another. The plan is equally flexible in following the borrower from one property to another property in other geographical locations. The advantage to the borrower in moving from one property to another is that his or her credit and payment record has been previously established. There are no extra costs in providing a new mortgage. The only cost is in the title search and legal costs related to the sale of one property and the purchase of another.

The mortgage plan of the present invention includes all of the documents required to effect and to administer the new mortgage. Full documentation is provided for both fixed and adjustable rate mortgages; for fixed or adjustable equity based mortgages; or mortgages sold into the annuity market. The three plans are suitable for marketing respectively as a residential mortgage plan; a tuition loan plan; and retirement mortgage loan plan. Unless otherwise specified hereinafter, only the residential mortgage plan is disclosed herein; although, it being understood that the other two plans are conceptually similar to the residential mortgage plan.

Provided with the plans are fully flexible, and the system 10 provides monthly and annual reports on all aspects of the mortgage loan to all interested parties for borrowers up to the age of 100.

The mortgage plan provides for an "interest only payment mortgage" for a certain period, such as 15 years, 30 years, 45 years, or an integral in which the face amount of the mortgage loan is matched to the face amount of an interest sensitive insurance policy investment vehicle, and a target cash value equal to the loan at a predetermined period certain. The target cash value is then increased by a 15% load.

The borrower agrees to be life insured in favor of the lender, and the life insurance is a pre-requisite to effecting the loan. The additional interest charged by the lender is determined by the period certain that the lender expects the cash value of the policy to equal the loan principal. For example, a thirty year mortgage schedule requires an additional 1% interest payment (above the interest rate charged for a conventional fixed rate mortgage), over the period, whereas a fifteen year schedule requires an additional 3% interest above the conventional mortgage interest rate.

At periods certain, the lender agrees contractually according to the plan to pay the additional interest back to the borrower. This is the cost containment clause option. To earn the privilege, the borrower must have maintained a prompt and timely payment schedule, and otherwise adhered to all of the conditions of the mortgage plan. The borrower must apply for these payments within thirty days of the last month before the fifth, tenth, fifteenth, twentieth, twenty-fifth, or thirtieth anniversary of a thirty year loan. The payment is made to the borrower in cash. In agreeing to make the payment, the borrower must retire the mortgage in the full amount at the elected option dates.

The lender agrees, at the request of the borrower to transfer all rights of the insurance policy held by the bank on the life of the borrower to the borrower upon payment of the amount paid by the bank for the policy.

It should be noted that the funds paid by the lender to the borrower at this time, may incur a tax-deductible expense for the lender and a taxable event for the borrower. It should also be noted that the cash values in the policy usually exceed the cost of the policy at the time of the purchase. As the borrower now owns the policy, he or she may withdraw, without further tax implications, an amount sufficient to pay the tax on the amount awarded by the lender at the option date. The borrower may not, however, withdraw an amount in excess of the amount he or she paid for the policy, without tax implications.

The new plan is designed to maintain a target cash value in years certain, to enable the borrower to borrow from the cash value of the policy, enough to pay the lender the total amount of the mortgage and thereby cause it to be retired. There remains in the policy an amount sufficient to maintain the policy, by paying the annual required premium and loan interest from the non-impaired capital and interest in the policy. On the death of the insured, the outstanding loan is repaid from the non-taxable death benefit.

In addition, the mortgage plan may provide for making the mortgage payments for the borrower, in the event that the borrower becomes unemployed. According to the plan, after 30 days of unemployment, the mortgage plan provides for the mortgage payments on behalf of the borrower, until the borrower obtains new employment or for twelve months, whichever comes first.

Considering now the advantages to the lender for adopting the mortgage plan implemented by the system 10, in greater detail. Firstly, the lender is protected against rising interest rates, due to a rapid increase in the lender's surplus, (the total mortgage plus the annual increase in cash value of the interest sensitive life insurance policy). Also, the lender receives larger mortgage interest earnings, without additional investment expense as compared to a conventional mortgage. Therefore, the lender has protection from interest fluctuations over the term of the new mortgage plan. If interest rates increase, the interest earned by the insurance policy increases and the lender may withdraw the excess earnings at any time to balance the current income.

Furthermore, there is a pool of reserves from which the lender may borrow at guaranteed interest rates.

There is no re-investment of capital from small principal repayments. Also, there is added security for the mortgage loan due to the investment vehicle.

The lender may, under certain conditions, deduct the premiums paid for the insurance on its income taxes as a necessary business expense. The lender may charge, as a normal business expense, the costs of payments to the borrower of the cost containment options.

If the borrower should die during the period of the loan, the lender is assured of the mortgage obligation being paid, and the property is maintained as an asset unless, the lender has assigned the death benefit of the policy to a third party. In this regard, the death benefit replaces the accumulated cash value.

If the borrower becomes unemployed, all mortgage payments continue to be paid up to one year thereafter.

Considering now in greater detail the advantages to the borrower resulting from the inventive mortgage plan. Firstly, the cash flow and after tax costs on an "interest only" mortgage plan are considerably less than a flexibility in his or her mortgage arrangements, in that, the same mortgage commitment and payment plan can be transferred to any credit worthy property that he or she purchases subsequently.

The borrower pays off the mortgage in the same period that he or she would have done so with a conventional mortgage without any principal repayment. The borrower can arrange mortgage life insurance as with any conventional mortgage, if he or she so chooses. The borrower may enjoy a fixed rate mortgage for long periods. The principal may be paid off at any time.

The cost containment option creates a real interest charge, no greater than the conventional mortgage. Also, if the borrower becomes unemployed, the borrower can maintain the ownership of his or her residence, and thus the borrower's peace of mind is eased during the transitional period between employers.

The system 10 effects a close supervision and maintenance of substantially all of the integral parts of the plan. The system 10 provides an ability to incorporate specific data for a large number of insurance companies, and it is capable of seeking the most competitive rates of such insurance companies, subject to certain industry accepted standards. The system 10 provides service support for a large number of mortgage lenders, both as direct writers of the mortgage plan, and as secondary and tertiary markets for a single borrower utilizing the mortgage plan.

The system 10 enables the borrower to move from one residence to another, while retaining the same mortgage plan for the current residence. Thus, without incurring another loan origination fee, the borrower can relocate repeatedly in a convenient manner, any number of times during the life of the mortgage plan. Since the borrower is permitted under the terms of the mortgage plan to obtain a greater amount of financing, each relocation can cause a possible change in insurance amounts, mortgage payments, monthly payments, years to complete the program, new secondary markets, etc. The ripple effect from any of the changes must be recorded throughout the mortgage plan by the computer program of the system 10.

The computer program is also designed to cause monthly statements to be generated for each lender on the status of the insurance program supporting the mortgage plan to be generated. The reports show the amount that was assumed to be credited to the account and the actual amount credited (such as the change in the proposed and actual interest rates). The reports also show the lender the accumulation in both accounts and any action taken by the lender, as far as invading the accumulated amounts.

The borrower receives a status report annually on his or her mortgage, reflecting the total interest paid to the lender and the amount that may be taken from various tax levels, such as federal, state, county, and city, taxes. The system 10 shows the annual accumulation and the amount credited to the cost containment option as hereinafter described in greater detail. In the appropriate years, the system 10 prepares an authorization to activate the cost containment option and the ongoing options and features. The program also provides a continuous reporting to the borrower after he or she has opted to purchase the insurance policy from the bank. This part of the mortgage plan continues until the death of the policy owner, and it provides annual reports about the borrower's policy loan, interest charged on the loan, interest credited to the impaired cash value, the unimpaired cash value, and the interest credited to the unimpaired cash value.

The system 10 provides an annual report on the status of the policy, after such report is received from the insurer. Furthermore, on a specified month of each year, such as in February, the system 10 develops a report for Federal, State and City tax authorities indicating the amount of interest paid during the year; the principal repayment, if any; refinancing expenses; insurance expenses and cost containment payments. The computer program of the service computer 12 is designed as a continuous cycle, to cover one or more changes on the part of the lender, borrower, insurer, administrator, tax law, or third party beneficiary, which affects a number of related mortgage plan activities.

(D) SYSTEM COMPUTER SOFTWARE

Referring now to the flow charts illustrated in FIGS. 2-9, each insurance company of the system 10 has one or more dedicated databases stored in its computer for its investment vehicles to help collateralize the mortgage of the inventive mortgage plan. For instance, each insurance company can have three different types of investment vehicles in the form of insurance policies, which are known generically as "Universal Life", "Whole Life", and "Annual Premium Interest Sensitive Ordinary Life". Such policy structures require certain data to be entered into the corresponding databases stored in the insurance company computers, and copies thereof, sent therefrom to the common service computer 12 for storage therein. Thus, the insurance data bases stored in the service computer can be updated periodically, so that the insurance information can be maintained current.

The input data includes such information as the product parameters, data by age, amount discounts, mortality costs, administrative charges, current interest rates, calculations on accumulations, loan charges and other such similar information. The input data can be modified as necessary to reflect the current information. Such information is stored and can be retrieved by a general search for the most competitive rates by age and amount, or to elect a single insurance company, if that is preferred by the lender.

Figure 2B:
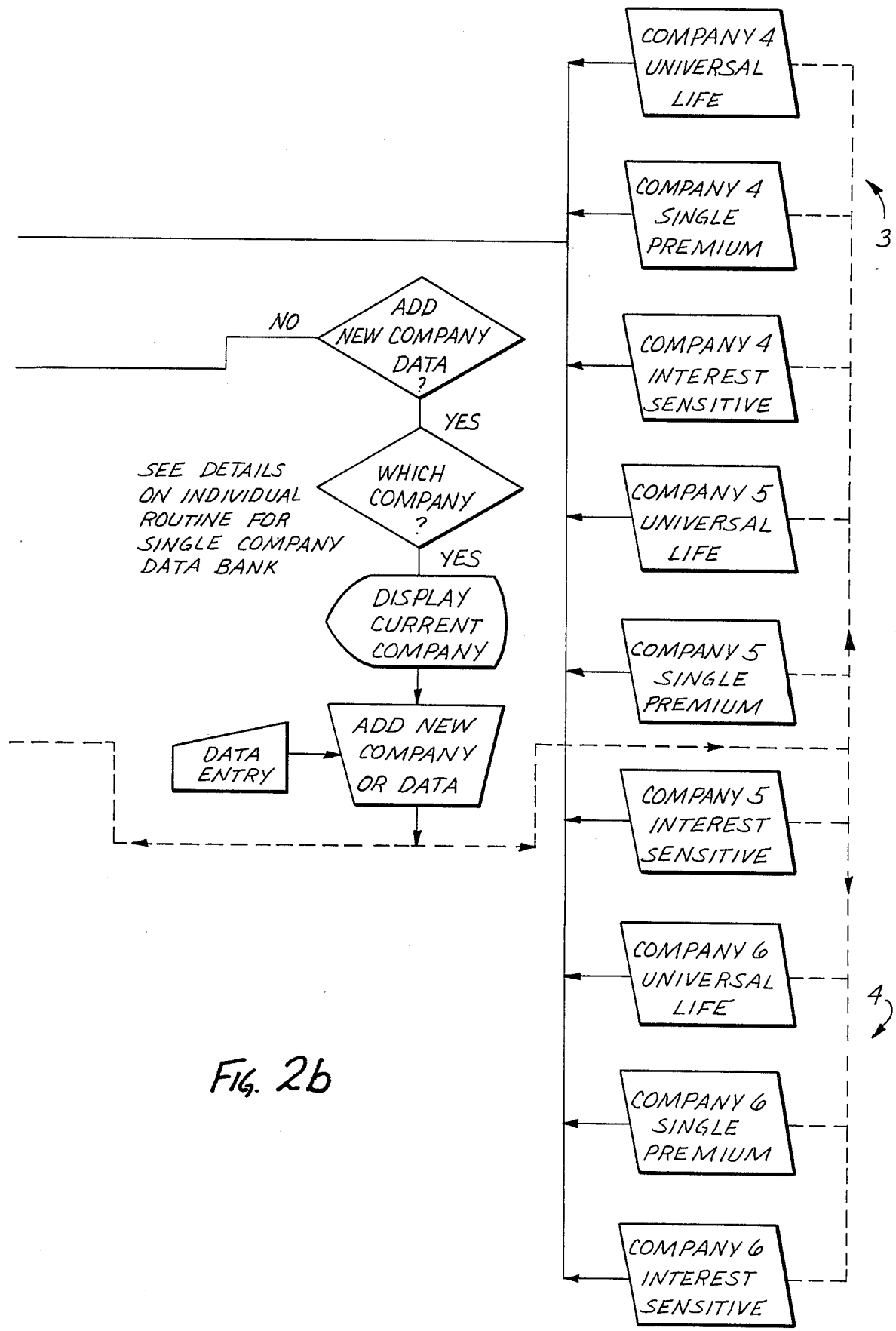
FIGS. 2 through 9 are flow charts illustrating a computer program of the system of FIG. 1.

Considering now a specific example, with reference to FIG. 2 of the drawings, the program starts at "A" as indicated, and then proceeds through the Insurance data bank. The information comes from the Borrower's (and Lender's) file. His or her data includes the borrower's age, sex and rating (smoker or non-smoker). The program then at 190 performs a random search of the insurance companies to search for the current "cost of insurance" current interest rate credited, current surrender charges, and current expense factors. The company offering the best program is then determined.

After determining the company, the program enters its data bank at 191, and from the borrower's file, starts to match age, sex, and rating. It first asks Smoker or Non-smoker status to determine the path to follow. If non-smoker status is elected, it then asks whether Male status. A positive response then selects the appropriate number of years and finds from the data, the present value of $1,000 in the future. Thereafter, that data is combined with the cost of insurance, the surrender charges and expense charges (if any), and then proceeds to prepare the formula.

The completed data is then held in memory (not shown) of the service computer 12, until the mortgage data is prepared. If the response is negative, the program seeks the information from the female Non-smoking rates and holds the completed numbers in memory in the service computer as the program then goes on to the data bank. If at the prompt, the response is "Smoker", the next prompt asks if "Male", the "Yes" prompt then seeks the age and prepares the formula as described. It holds the information in memory to be collated with the other information. If the answer is "No", then the female smoker rates and interest computations are held in the memory of the service computer, to prepare the full proposal. This example will now be considered in greater detail.

In order to establish the yearly insurance premiums to effectuate the inventive mortgage plan, the face amount of the insurance policy is determined by the system 10 so as to establish a sufficient investment fund in the cash value of the insurance policy. In this regard, the software of the computer system 12 calculates the insurance premium, which is a total of three components. In this regard, there is the investment fund portion, the insurance risk portion, and an administrative portion for the insurance company. This formula may vary from one insurance company to the next, but the service computer 12 stores the current data information for each insurance company, together with the actuarial formula for each company.

The service computer 12 bases the investment fund portion on the amount of the mortgage plus 20 percent. The additional 20 percent allows for the additional features of the mortgage plan, such features as the lender protection as previously described, the cost containment option, and the self-servicing policy provided for at the end of the mortgage term. Whereas, the insurance risk portion is based on the exact amount of the mortgage. The administrative portion is always a fixed constant for each insurance company.

A subroutine is run to determine the annual insurance premium cost of the inventive mortgage plan. A Borrower Data File 13 is used to determine the Borrower's (a) age, (b) class (smoker or non smoker), and (c) sex (male or female). The file 13 is a part of the mortgage information received from a given insurance company, and is stored in the computer 12.

The file 13 also includes the amount of the mortgage, and the period in which the cash value must equal the amount of the mortgage plus 20 percent. The file also contains the projected interest rate assumed for the Universal Life Insurance Policy.

In order to calculate the investment portion of the insurance premium cost, the program causes the file stored in the computer 12, to be searched for the annual payments made in advance, that will amount to $1,000 in a number of years certain, at the determined interest rate. Such information is a part of the computer information received from the insurance company, and stored in the computer 12. That number is then multiplied by the mortgage amount plus 20 percent; e.g., a $100,000 mortgage at 9.5% in which the amount is due in 30 years, would require $120,000 at $6.10 per 1,000, or ($6.10×120)=$732 annually.

The program then causes the computer 12 to search for the file containing the annual insurance risk costs for the insured category (male, non smoker, age 30). All of the risk values are added together for the specific number of years (e.g., 30 year mortgage) is age 30+31+32+33 34+35+36+37+38+39+40+41+42+43+44+45- +46+47+48+49+50+51+52+53+54+55+56 57+58+59. The result of this number, which is the cost per $100,000 of protection, is then multiplied by the mortgage amount from a stored file, and divided by $1,000. For example, $1000,000 mortgage for 30 years for a male, non smoker, age 30, the total risk cost for 30 years is $64.83 per 1,000 from the file. The program multiplies this number by the amount of the mortgage, and thus the total risk cost is 64.83 multiplied by $100,000 divided by $1,000=$6,483 for 30 years. Then by dividing that amount by 12, there is obtained an annual risk cost of $216.10 per year.

The investment amount is added to the annual risk portion. Thus, $216.10+$732.00=$848.10 annually. However, this total amount must be tested by iteration to target the correct amount, because the slight fluctuation in the risk amount may overreach the target. The program then causes the following calculation to proceed:

iterate:

$$E=[A+F-(B\times C)]\times(1+D), \text{ until: } E=M+XM,$$

where:
A = annual insurance premium
B = annual risk portion per $1,000
C = amount of the mortgage divided by $1,000=M ⓡ 1000
D = elected cash value interest rate
E = accumulated cash value plus interest
F = accumulated cash value plus interest (E) from previous year
M = amount of the mortgage
X = fixed percentage By the above formula, the accumulated cash value plus interest (E) is iterated, until it is equal to a target amount, which is the amount of the mortgage (M), plus a fixed percentage (X) times the amount of the mortgage (M). In the present example, X=20% and M=$100,000. Therefore, the annual insurance premium (A) is varied, until:

$$E=\$100,000+(20\%)(\$100,000)=\$120,000.$$

According to the formula, in order to calculate E, an assumed annual insurance premium (A) is added to the accumulated cash value plus interest from the previous year (F), less a risk component (B×C). The resulting amount is multiplied by one plus the interest rate, to give the current cash value plus interest.

The risk component is calculated by determining the annual insurance risk portion (B) for a given year per $1,000 of coverage from a file, and multiplying it by the amount of the mortgage divided by $1,000 (C). Thus, the risk component is determined by a given insurance company and must be applied to the given mortgage amount for each year.

The value for E is calculated for an assumed value of A for the first year of the plan. Utilizing the value of E for the first year, then the value for E for the second year is calculated. This process is repeated for each year of the mortgage, until the final year (year 30) is calculated.

If the resulting amount is less than the target amount ($120,000), then a different value for the annual premium (A) is selected. If the result is less than the target amount for E, then the difference is taken between the calculated value for E and the target value for E. The resulting difference is then added to the previously-used assumed value of A, to provide another value of A for the calculations.

The formula for E is then repeated for the term of the mortgage to determine the value of E for the final year of the mortgage (year 30). If that calculation differs from the target value for E, another value for A is selected, and the calculations are then repeated.

If, at any time, the resulting calculation of E for the final year of the mortgage is higher than the target value for E, then $1.00 is subtracted from the previously used value for A, to determine a new value for A to be used in another calculation run for the value of E at the end of the mortgage.

Once the calculated value for E equals the target value for E, then that value of A is used for the annual insurance premium.

As an example of the iteration calculation, assume that A=$848.10, and that D is equal to 9½%. It can be assumed that the interest rate for the cash value accumulations is to the mortgage plan interest rate. The value of C is the amount of the mortgage ($100,000), divided by $1,000, which equals 100. For the first Year, the value of B=1.30. The calculations proceed as follows:

Year 1: $848.10+0-(1.30\times100)\times1.095=786.31$

Year 2: $848.10+786.31-(1.26\times100)\times1.095=1,651.70$

Year 3: $848.10+1,651.70-(1.24\times100)\times1.095=4,632.81$

Year 4: $848.10+4,652.81-(1.24\times100)\times1.095=5,865.81$

Year 5: $848.10+5,865.81-(1.24\times100)\times1.095=6,491.85$

Year 6: $848.10+6,491.85-(1.24\times100)\times1.095=7,901.46$

Year 7: $848.10+7,901.46-(1.25\times100)\times1.095=9,443.90$

Year 8: $848.10+9,443.90-(1.28\times100)\times1.095=11,129.92$

Year 9: $848.10+11,129.10-(1.33\times100)\times1.095=12,969.92$

Year 10: $848.10+12,969.92-(1.38\times100)\times1.095=79.62$

Year 11: $848.10+14,979.62-(1.44\times100)\times1.095=16,439.57$

Year 12: $848.10+16,439.57-(1.50\times100)\times1.095=18,765.57$

Year 13: $848.10+18,765.57-(1.57\times100)\times1.095=21,305.24$

Year 14: $848.10+21,305.24-(1.65\times100)\times1.095=24,077.24$

Year 15: $848.10+24,077.24-(1.75\times100)\times1.095=27,101.62$

Year 16: $848.10+27,101.62-(1.85\times100)\times1.095=30,402.37$

Year 17: $848.10+30,402.37-(1.97\times100)\times1.095=34,001.36$

Year 18: $848.10+34,001.36-(2.09\times100)\times1.095=37,931.30$

Year 19: $848.10+37,931.30-(2.23\times100)\times1.095=42,219.26$

Year 20: $848.10+42,219.26-(2.37\times100)\times1.095=46,899.24$

Year 21: $848.10+46,899.24-(2.53\times100)\times1.095=52,006.30$

Year 22: $848.10+52,004.30-(2.67\times100)\times1.095=57,583.21$

Year 23: $848.10+57,583.21-(2.82\times100)\times1.095=63,673.49$

Year 24: $848.10+63,673.49-(1.97\times100)\times1.095=70,325.93$

Year 25: $848.10+70,325.93-(3.14\times100)\times1.095=77,591.73$

Year 26: $848.10+77,591.73-(3.31\times100)\times1.095=8,529.17$

Year 27: $848.10+77,591.73-(3.57\times100)\times1.095=94,192.19$

Year 28: $848.10+94,192.19-(3.87\times100)\times1.095=103,645.35$

Year 29: $848.10+103,645.35-(4.19\times100)\times1.095=113,961.52$

Year 30: $848.10+113,961.52-(4.58\times100)\times1.095=125,215.02$

The target amount was determined to be $120,000, and the resulting calculation is larger than the target value. The program through iteration lowers the annual deposit by the accumulated value of $1.00 with interest at the end of a number of a year certain (e.g., 30) reducing the annual amount by that factor. Again, through iteration, the target amount of $120,000 is eventually reached.

On determining annual growth of the policy, the annual expense factor is then selected through the same process. The file contains the annual "surrender charge" or expense factor for each year (see data file).

This charge is then multiplied by the face amount and extended to the current cash value. As each year passes a new surrender charge is selected.

The formula is $$A-(B\times C)(1+0.095)=D$$

A—current cash value from previous series
B—the surrender charge corresponding to attained age, sex, and class (smoker/non smoker)
C—the face amount
D—the annual cash value Thus, in the previous example - male, non smoker, age 25=

Year 1: $786.31-(9.98\times100)=0$
Year 2: $1,651.70-(10.04\times100)=647.70$
Year 3: $4,632.81-(10.23\times100)=3,609.81$
Year 4: $5,865.81-(10.26\times100)=4,839.81$
Year 5: $6,491.85-(10.44\times100)=5,447.85$
Year 6: $7,901.90-(10.61\times100)=6,840.46$
Year 7: $9,443.90-(10.91\times100)=8,352.90$
Year 8: $11,129.58-(11.01\times100)=10,028.58$
Year 9: $12,969.92-(11.28\times100)=11,841.92$
Year 10: $14,479.62-(11.73\times100)=13,306.62$
Year 11: $16,439.57-(11.94\times100)=15,245.57$
Year 12: $18,765.74-(12.51\times100)=17,514.74$
Year 13: $21,305.24-(13.02\times100)=20,003.24$
Year 14: $24,077.24-(13.73\times100)=22,704.24$ Year 15: 27,101.62−(14.39×100)=25,662.62
Year 16: 30,402.37−(15.24×100)=28,878.37
Year 17: 34,001.36−(16.04×100)=32,397.36
Year 18: 37,931.30−(16.85×100)=36,246.30
Year 19: 42,219.26−(17.60×100)=40,459.26
Year 20: 46,899.24−(18.74×100)=45,025.24
Year 21: 52,006.30−(19.62×100)=50,044.30
Year 22: 57,583.21−(20.53×100)=55,530.21
Year 23: 63,673.49−(21.65×100)=61,508.49
Year 24: 70,325.93−(22.46×100)=68,079.93
Year 25: 77,591.73−(23.78×100)=75,213.73
Year 26: 85,529.17−(24.91×100)=83,038.17
Year 27: 94,192.19−(26.25×100)=91,567.19
Year 28: 103,645.35−(27.83×100)=100,862.35
Year 29: 113,961.52−(29.29×100)=111,032.52
Year 30: 125,215.02−(31.29×100)=122,086.02

The program is the basis for annual reports and other updates and is then used as the basis for the annual reports. Current interest rates are placed on file and are made concurrent.

As shown in FIG. 2 of the drawings, a mortgage databank as indicated at 6D is stored in the service computer 12 of the system 10, and data concerning the principal, interest and monthly payments on conventional mortgages for a relatively long period of time and for a relatively wide range of interest rates, are compiled. For instance, the data can be compiled over a range of 1 to 50 years and for interest assumptions ranging from 0 to 35 percent. The mortgage amounts can be limited to $2,000,000. The mortgage data bank also stores the monthly payments on an interest only loan for a given amount.

Current rates of taxation are compiled in a rates of taxation databank 7D for illustrating the effect of the principal and interest accumulation after tax for a given borrower.

Should the borrower show interest in pursuing the program offered by the system 10, an administrator receives a copy of the borrower's medical information and mortgage application. Such information is then entered into the borrower's permanent file, along with the upgraded insurance/mortgage file, and is treated as a permanent file replacing any proposal information.

At this point, the program of the system 10 causes the support documents to be prepared the Narrative Disclosure and Truth in Lending documents which include the borrower's name, address, and appropriate mortgage, insurance and Cost Containment Option data. One of the four mortgage documents is either a fixed or adjustable rate mortgage, as either a first or second mortgage. If desired, other mortgage documents can be added to the base selection.

The pertinent information is added to the proper document and the package is forwarded to the lender via the modem connection between the lender and service computers. The lender in turn completes the insurance application and forwards the documentation to the service computer 12 (FIG. 1). While the information or documentation can be sent from the lender's computer, such as the computer 14A, to the service computer 12 over the modems 20A and 22, and the telephone link 13, for processing, the information can alternatively be stored on conventional storage devices, such as a floppy disk, and mailed to the service computer 12 for processing.

The service computer 12 in turn records the submission of the information and documentation from the lender, and forwards the application to the insurance company for entry on its computer, such as the computer 16A. Upon issuance, the insurance policy is forwarded to the lender. An assignment is then entered in both the lender's and borrower's databases. A monthly status report is then sent to the lender showing the number of mortgages issued (and remaining) with the lender, the total amount of the assumed interest accumulation, the total amount of the accumulated actual interest, the loans made against the cash value accumulation, the amount of interest due on those loans, and the date of the upcoming options and the amount that may be due. Such information further includes the monthly premium billing and the monthly charges due to the service company providing the service computer support.

A semi-monthly review is made on all accounts to upgrade the information. The upgrade includes any transfer of mortgages from one lender to another lender, as well as any change of interest or other data from an insurer, any change in assignment of the insurance assignments, any change in tax information, and any change in the borrower's credit status. Corresponding changes in automated document forms are also made.

The annual reports to the borrower reflect substantially all the information that he or the is required to have for the preparation of an income tax return. The annual reports provide the cost of mortgage insurance, the total amount of interest paid and, if the borrower has elected to take an option, as it will be explained later in greater detail, he or she would receive the total amount of the option credit and the amount of the tax due assuming three illustrated tax brackets. The reports also indicate whether the amount of the option credit should be included in the borrower's income for that particular year. The reports further indicate the amount withdrawn from the borrower's cash value, the amount remaining therein, and the amount due to clear the mortgage.

In the event the option date has passed, and the option has not been exercised by the borrower then the borrower will be notified of that fact on a semi-monthly basis until the next time the option can be exercised. If the option has been exercised by the borrower or a final option date has been reached, the service computer 12 notifies the lender computer 14A via modem connection, that the option is taking effect, of the amount due to the borrower, the amount due to the lender, and the amount of the cash value that will be available under the policy. The service computer 12 then prepares an assignment of the cash values, the death benefit and the beneficiary designation from the lender to the borrower under the contract. The service computer 12 prepares the final mortgage statement and the tax credit documents for the lender including a temporary power of attorney to a trustee to withdraw a cash value equal to the outstanding mortgage amount from the insurance policy and to draw a check for that amount in favor of the lender. The service computer 12 provides mortgage release forms and assignment forms, to be completed by the trustees for both parties to effect the transfer.

The package of documents prepared includes the cost containment check from the lender to the borrower, and all the necessary documentation to record the transaction and to clear the mortgage obligation from the lender's and borrower's status file, while a hard copy and a microfiche of all such documents are retained by the trustee. All checks from the insurer, from the lender and from the borrower are certified, and are held by the trustee. Such checks are distributed simultaneously to all the parties. The outstanding loan is thus transferred from the lender to the insurance policy, and the guarantee for the loan is transferred from real property to the cash value of the insurance policy.

There are no further payments made by the borrower to either the lender or to the insurer. The program maintains the insurance policy in force on a loan basis. Each year the insurance policy is maintained and the policy holder receives an annual statement showing the loan guaranteed by the cash value of the policy, the annual and accrued interest charges, the interest credited to the impaired cash value and the annual and accrued interest to the unimpaired cash value.

The cycle is completed upon the death of the insured, and the loan principal is paid off completely to the lender from a tax free death benefit. The excess death benefit over the loan is paid directly to the named beneficiary without tax implication.

D1 INSURANCE DATA COMPILATION

In order to calculating the insurance costs, the computer program stored in the service computer 12, is designed to accommodate the information that is required to calculate the annual costs of the plan offered by the system S. The program is designed to calculate the death benefit required, and the projected target cash values at current interest rates, on an accumulated basis, as well as on an annual incremental basis. The program also projects the guaranteed cash value, both on an accumulated and incremental basis.

The program is designed to cause the display of, and to record, the amount of cash value impaired by loans and the interest charged to the impaired loan at fixed contractual rates. Such rates vary from one insurance company to another. The program also causes the display of the interest credited by each company to the cash value impaired by the loan. Whenever the cash value is not impaired fully by the loan, the program caused the recording of all of the current interest rates applicable to the non-impaired portion of the cash value.

The three preferred types of insurance policies which can be involved in the present plan, are generally known as "Universal Life", "Single Premium Interest Sensitive Ordinary Life", and "Annual Premium Interest Sensitive Ordinary Life". The "Universal Life" policy is the most flexible policy of the three policies. The face amount of the policy can be adjusted either as an increase, or as a decrease. The cash value can be enhanced by premium increases, or it can be reduced by lowering the premium or skipping the premiums. The Universal Life policy is generally sensitive to the fluctuations in the cost of money, and reflect changes in the interest rate credited from time to time by the various companies.

These interest assumptions are entered in the service computer 12 under the control of the computer program, on the date that such assumptions are effective. They would then create the income for the ongoing status of the non-impaired cash values, until further announcement is made. Each insurance company also guarantees a minimum interest rate, and although these vary from company to company, the guaranteed interest rate is fixed for the life of the insurance contract. These are recorded as minimum guarantees and are provided to the lender, until the policy is assigned and then the information is provided to the borrower. Although Universal Life is generic, and each company employs similar formulas, the emphasis that they place on particular portions of the formula provides a particular competitive edge.

Interest sensitive life insurance policies are not as complicated in design and are less complicated to enter and set up files under the control of the computer program. The interest generation is relative to the flexible interest rate on the developed cash value.

Universal Life insurance is comprised of a series of elements. Some of the these elements concern the present mortgage plan, while others do not. The elements that do not concern the present plan, however, are available in non-integrated data banks.

Figure 6A:
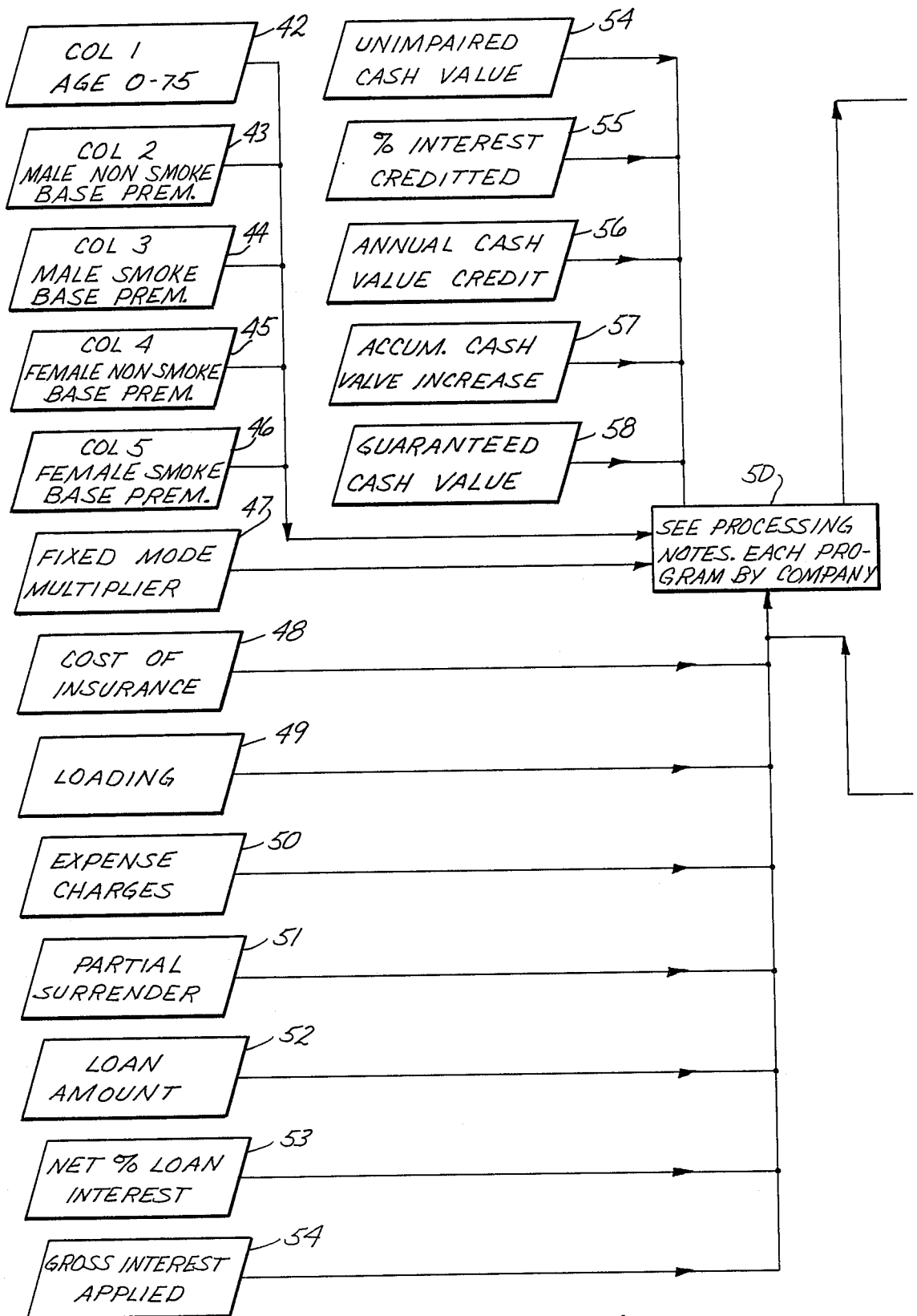
Figure 6B:
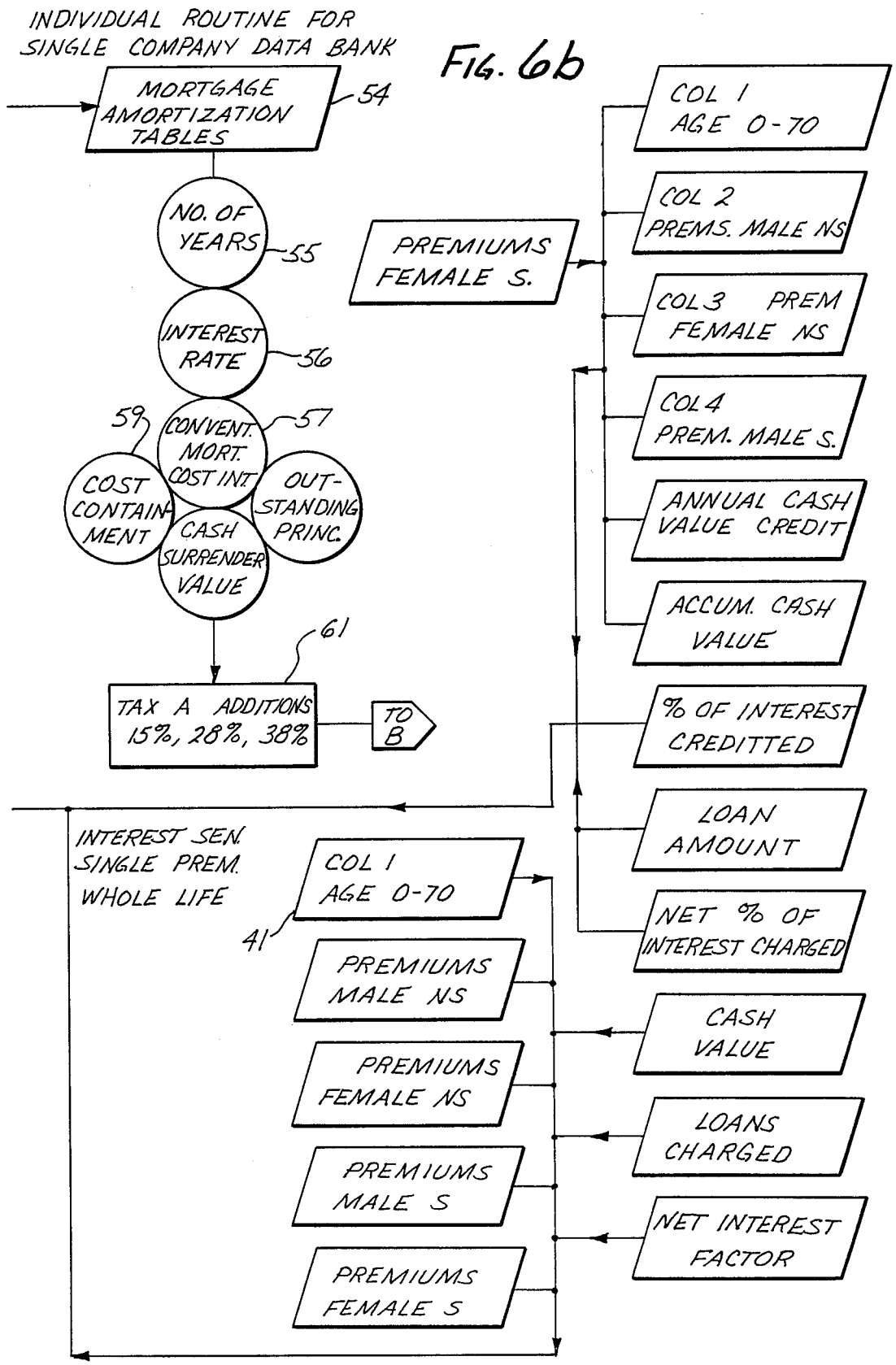
Figure 7A:
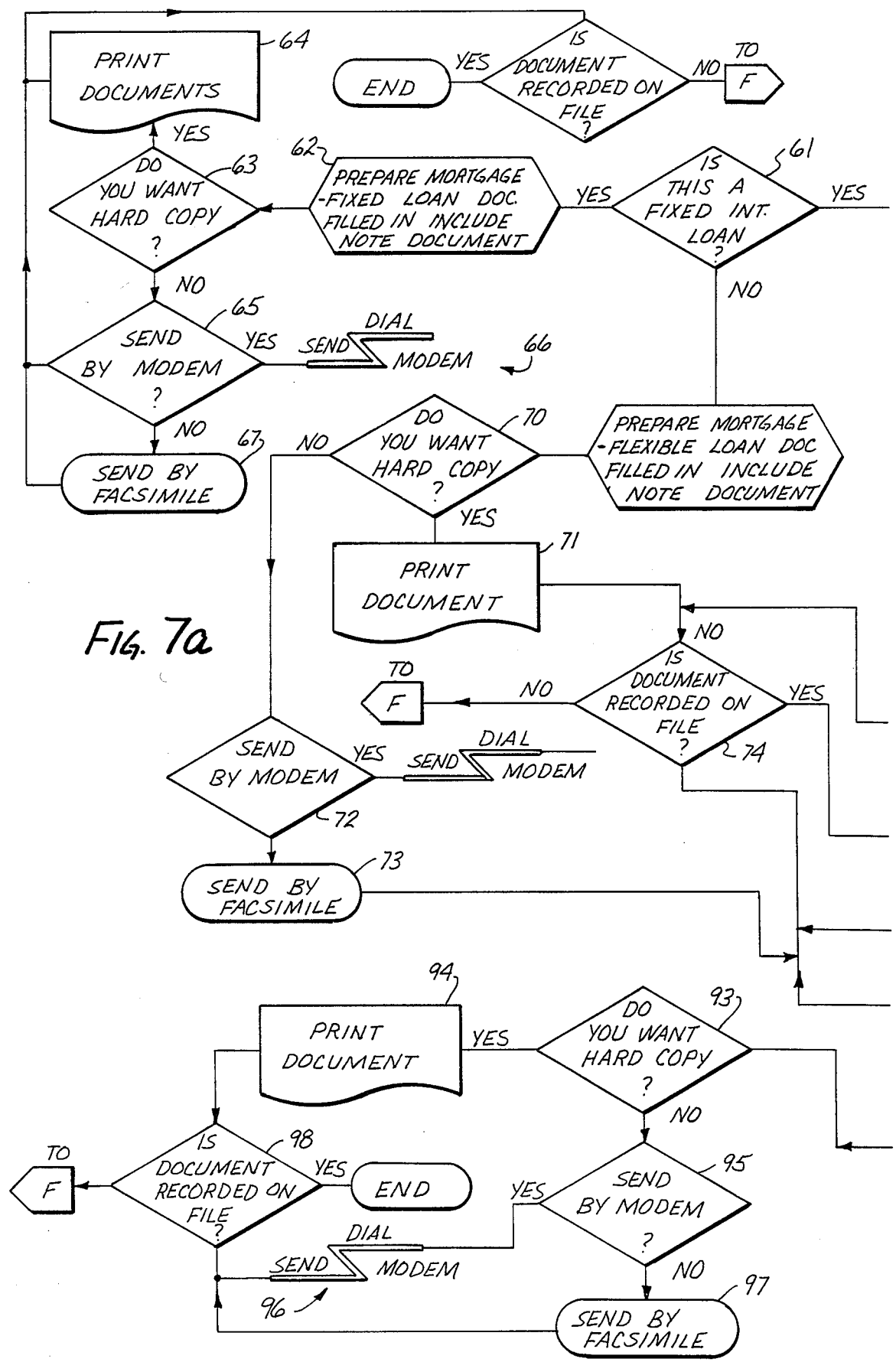
Figure 7B:
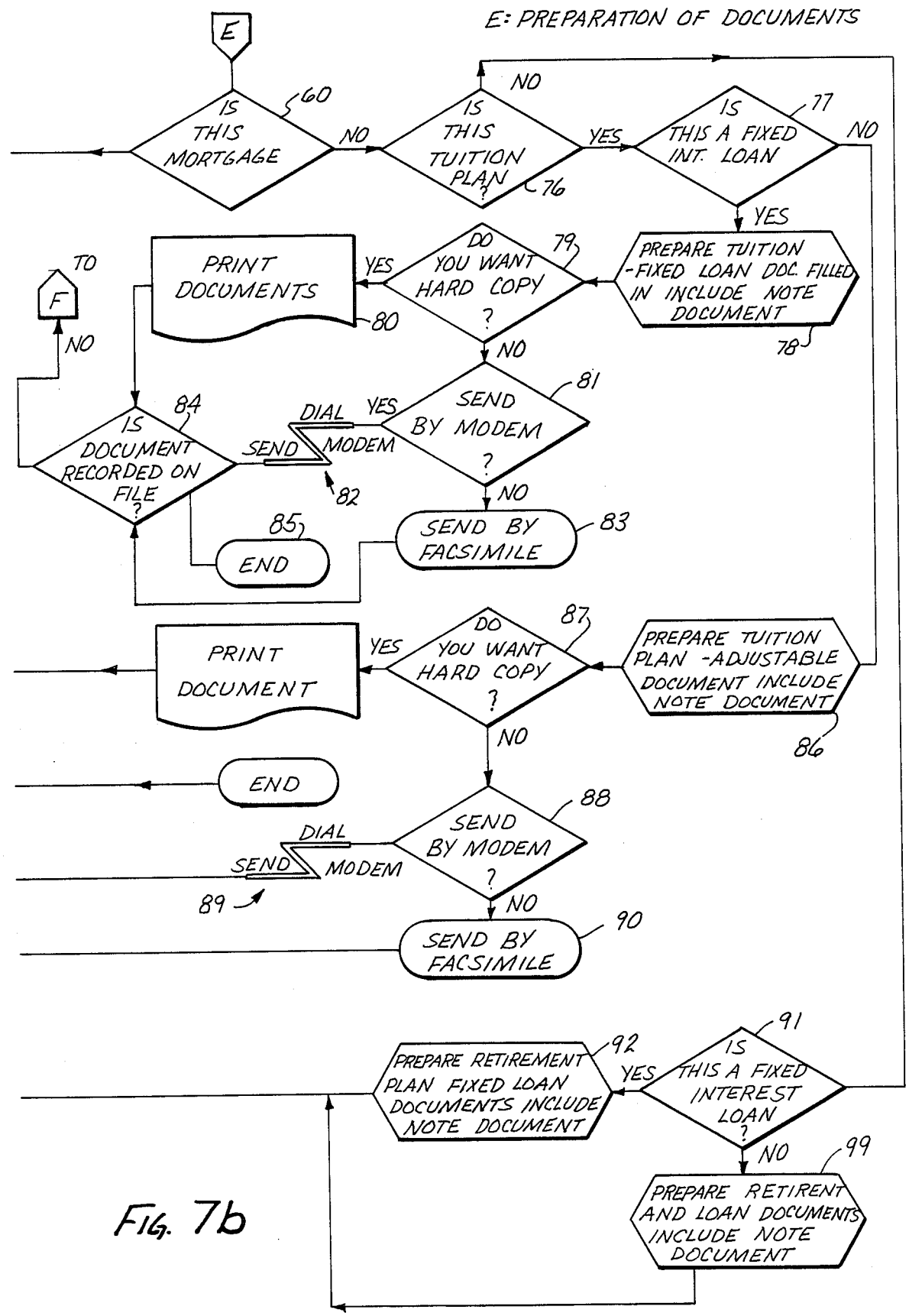

For Universal Life insurance, as indicated in FIG. 6, each insurance company sets a "minimum premium" for each $1,000 of protection. These premiums are scaled for males and females, and each one of these classes is sub-divided with smokers and non-smokers. The difference is in the basic rate by class and habit, and are reflected in the mortality charges.

Maximum premiums per $1,000 of the death benefit are set by federal statute under the Internal Revenue code. Between these two extremes, any amount may be paid into the program. From this premium, there are monthly charges made for: (A) mortality, (B) surrender charges, (C) administrative fees, (D) interest on policy loans, (E) withdrawals, and (F) loadings. Such components are the profit margins that the insurer is charging against the sale of the insurance policy for its profit. There are credits recorded for: (A) premiums paid; (B) quantity discounts; (C) interest on unimpaired funds; and (D) interest on impaired funds. The unimpaired funds are credited with current rates, and the impaired funds are credited at a contractually fixed rate, which is relevant to the interest charged by the insurance company on policy loans, usually a differential of about 1%.

The current interest rate may fluctuate monthly with some insurers and intermittently with others. Thus, the interest factor is recorded promptly to reflect all future interest credits.

The Universal Life policy also permits additional insureds, which are reflected in the mortality costs only, and further permits increases and decreases in the death benefit at any time, subject to certain underwriting conditions. These changes must be reflected immediately in the computer program.

D2 SINGLE AND ANNUAL PREMIUM INTEREST SENSITIVE WHOLE LIFE

Single and annual premium interest sensitive whole life insurance policies are not as complicated insurance policies as the Universal Life policy. They are however, sensitive to current rates of interest on the accumulated cash values, guaranteed rates of interest on one cash values and the rates of interests credited and debited to the part of the cash value that is impaired by loans.

D3 THE MORTGAGE DATA BANK

As indicated at 6D FIG. 2 of the drawing, considering now in greater detail, the Mortgage Data Bank is a sub routine of the computer program stored in the service computer 12, and is entered with amortization tables, which are manipulated to calculate the monthly, quarterly, semi-annual, or annual payments; the monthly reduction of principal; the monthly interest earned; the cumulative interest earned; the number of payments; variable interest rates; balloon payments; and when due. It causes the generation of interest only amounts and the balloon payment required at the end of the period at 6D.

Both calculations are required to develop a composite quotation. They are also required to prepare the mortgage documentation, and key information is extracted from these files for the "Truth in Lending" and "Narrative Disclosure" documents for the mortgage plan.

D4 THE TAX BASE DATA BANK

As shown at 7D in FIG. 2 of the drawings considering now in greater detail, the tax base data bank is a third sub routine which provides the tax tables and the multipliers which calculate the annual and cumulative costs of after-tax principal payments, and the annual and cumulative cost of interest pre-tax payments.; These calculations are incorporated in the computer program as part of the calculations for purposes of developing the ledger proposals at 7D.

The information required to prepare the ledger proposal is obtained from the borrower file at 13, and transferred from within the system to various areas in the program, as either transient information or permanent information.

The information entered into the program for Universal Life insurance must follow a pattern. The Insurance Company supplies the rates and data required for its product. The information is entered in the appropriate order, and is described in greater detail in the following section describing the Individual Routine for Single Company Data Bank at 42 through 58 of FIG. 6.

D5 INDIVIDUAL ROUTINE FOR SINGLE COMPANY DATA BANK

Figure 3B:
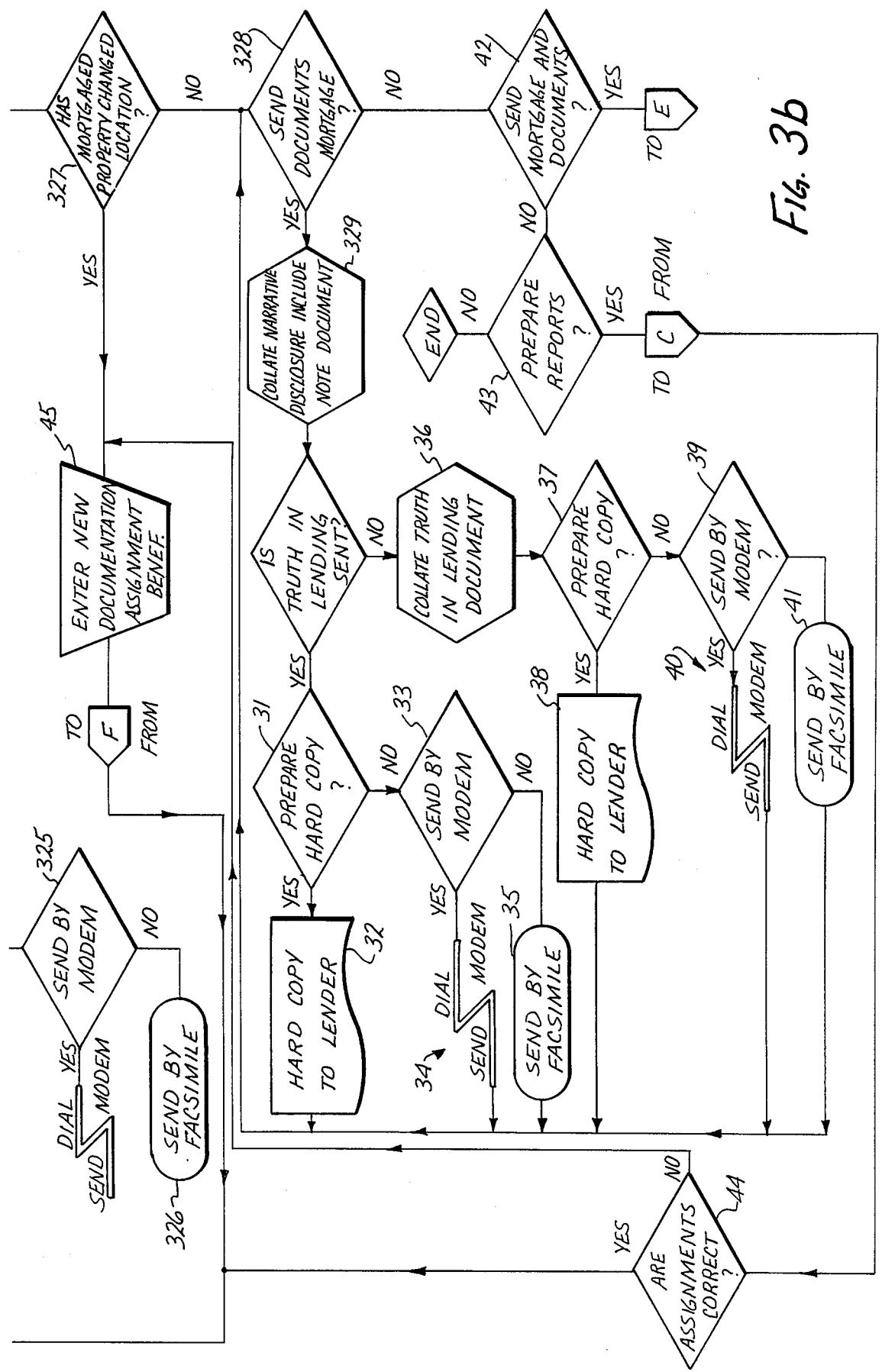
Figure 4A:
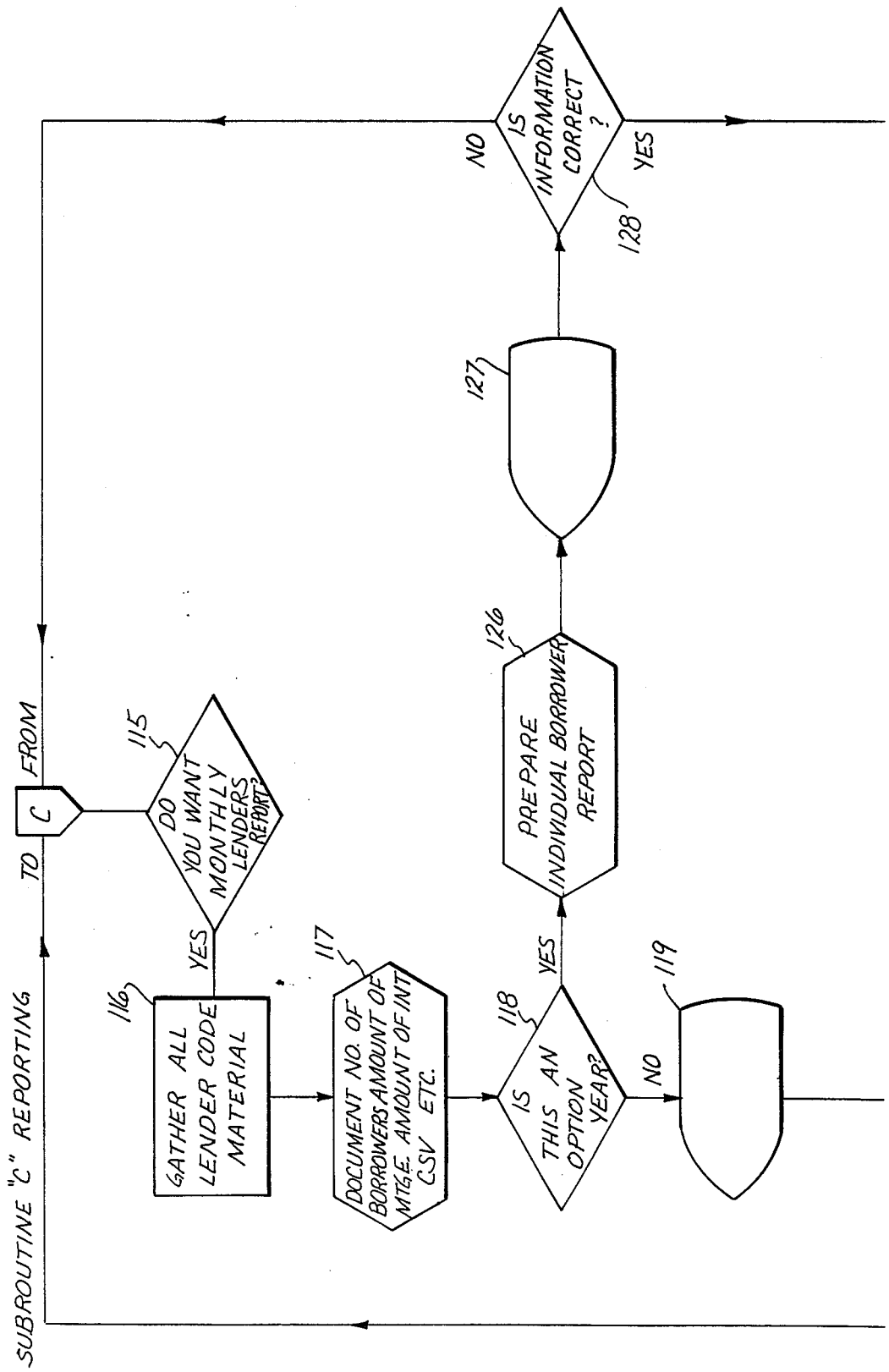
Figure 5A:
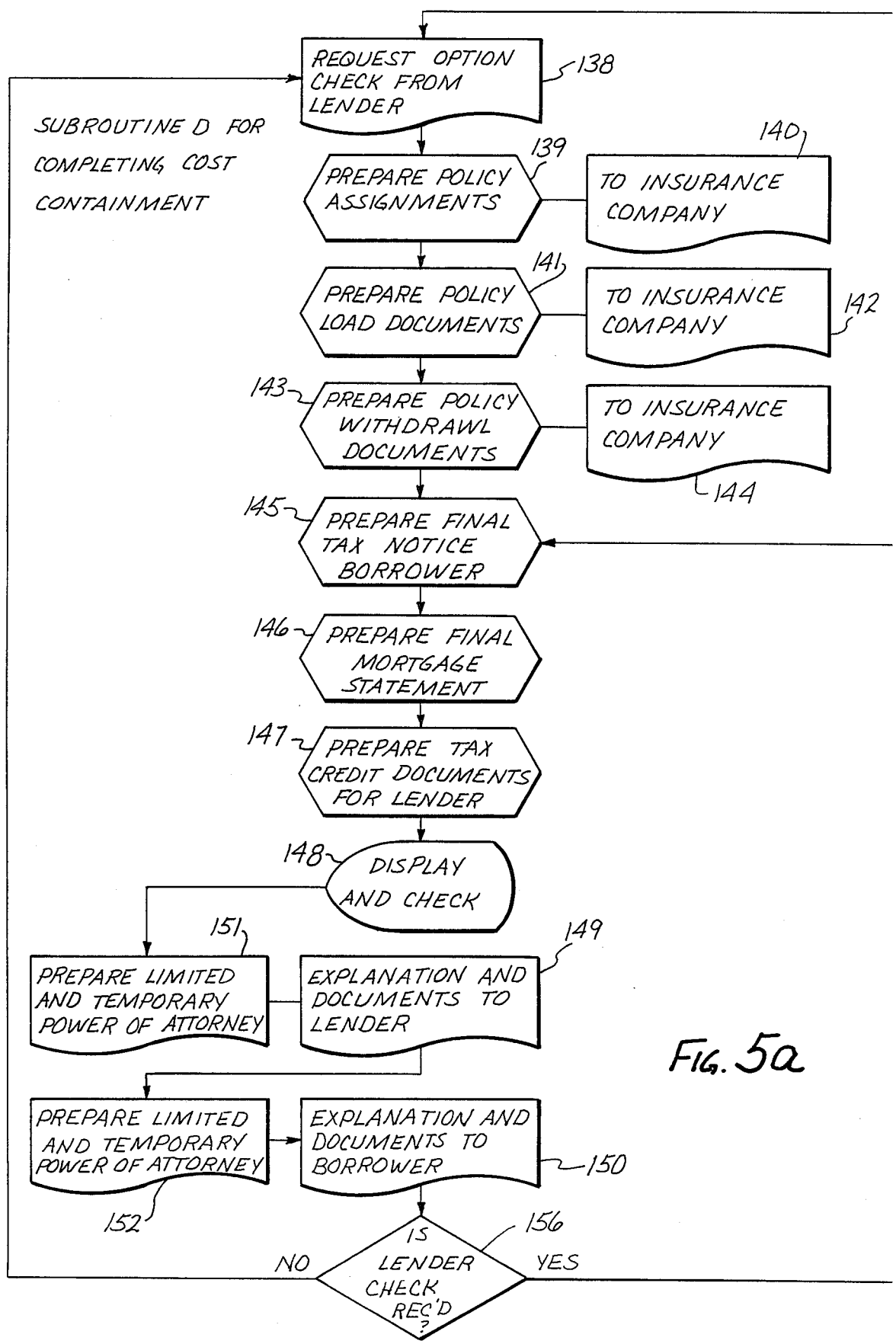
Figure 5B:
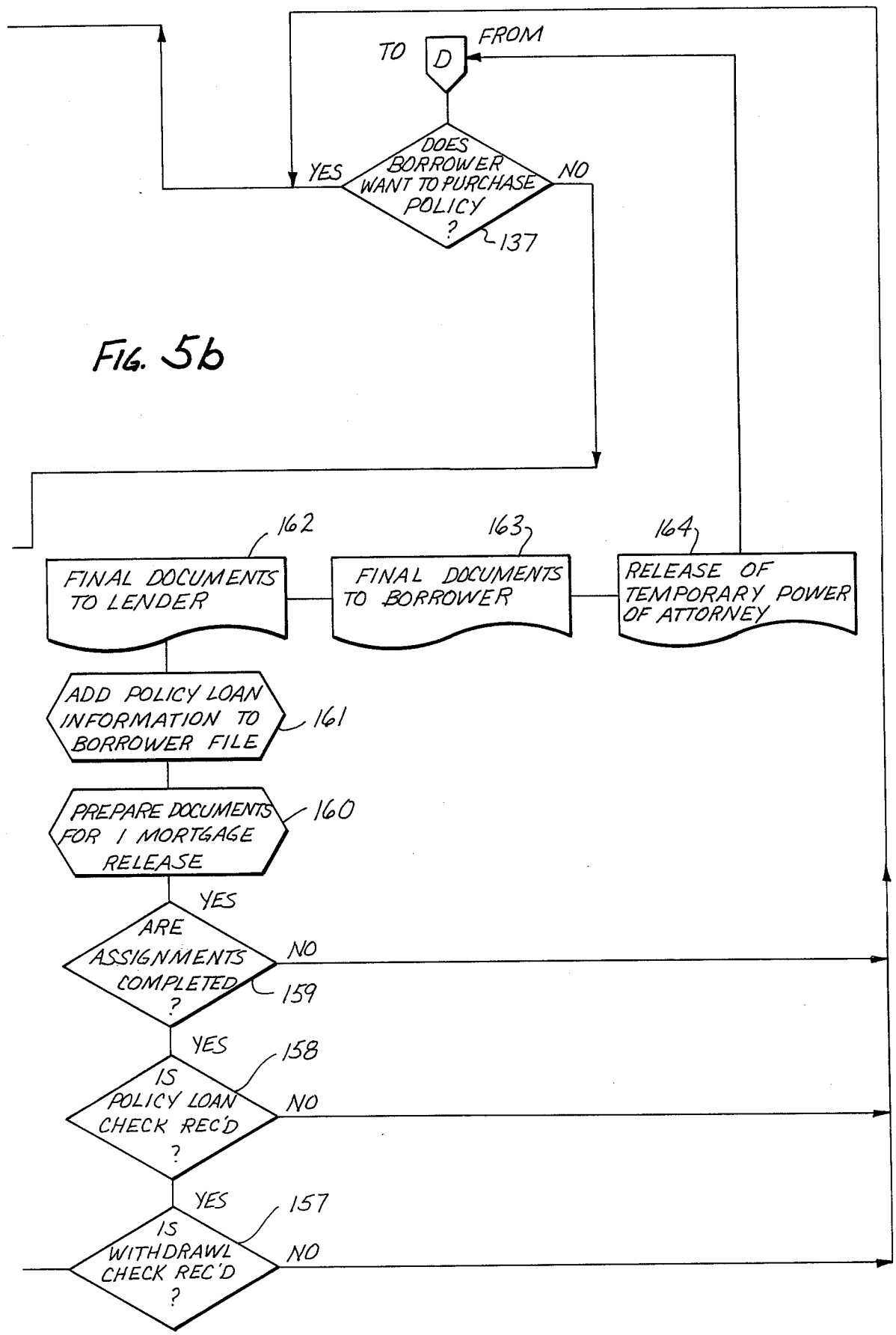

As indicated at 42 through 58 of FIG. 6, if the drawings, certain formats are followed, and two outputs are produced. The client information is entered into the program of the service computer 12 via a terminal at one of the lender computers or at the service computer 12, and the information includes the age, sex, and the smoker or non-smoker status. It also requests a "target cash value" in years certain. The computer program then develops, on a monthly basis, the annual cost of insurance by adding the "mortality costs", the "loading", the "expense charges", "partial surrenders", "loans", "interest charged to loans", and reduced the amount by "interest credited to loans." The target cash is then entered as an amount required in a number of years certain. This required annual (or, if desired, the semi-annual, quarterly or monthly rate, as previously explained, is then broken down through iteration to achieve the amount at current cash values. The entire proposal is saved in the Borrower's File at 13 (FIG. 3). The face amount and the columns showing the year by year increase of the accumulated cash value, and the annual cash value increase, are all illustrated. The same data is then entered into the amortization program, which then develops an amortization table of monthly interest and principal required to provide a conventional mortgage. The amounts are annualized, and the annual principal and annual interest, are multiplied by the appropriate tax factors (the pre-tax and after tax cost of money.) The annual cost of interest only is multiplied by the pre-taxcost of money. A summary comparing the cost of a conventional mortgage with the system mortgage is summarized. This information is then printed, and is sent to the lender in hard copy, ASCII print code or facsimile reproduction of the hard copy. For a more complete description, reference may be made to the description under the Section entitled Individual Routine for Single Company Data Bank.

The summary sheet is not maintained in the computer file, since it can be reproduced at any time from the Borrower's files. A hard copy is maintained for 12 months.

The amortization tables accept the principal amount of the note from the client's file and the number of years for amortization, the interest to be assumed, and calculates the principal and interest payments. The files or appropriate columns are then multiplied by an assumed tax factor, which then calculates the annual and accumulated cost of after tax payments.

Lender data which establishes a number for each lender, establishes the file to include the total information required for each lender. The information can be retrieved by any access: name of lender; Corporate Officer; any part of the address; number of mortgages; amount of mortgages; inception date of contract, as hereinafter described in greater detail.

Borrower data includes a number for each followed by the borrower's lender number. The data contained includes the current address of the borrower; the address of the proposed property to be mortgaged; the purchase price of the property; the amount of the mortgage; the proposed rate; the age and sex of the borrower; the time certain of the proposed mortgage at 9.

From this input at 8 at FIG. 3, a lender is billed a service charge by the service company, and invoiced on a regular monthly basis for all current mortgage activity at 10–11.

After establishing a lender contract, the lender then orders quotations and/or installs programs for the borrower. The lender first orders a proposal for a prospective borrower, and receives it from the service computer with all of the pertinent information and documents. To provide a quotation, the borrower information, on file, is used to develop an illustration, which is a report providing sample information on the mortgage plan of the present invention.

The illustration report is calculated and compiled by the service computer 12, and an illustration message is sent via modem link to the printer of the requesting lender, where a hard copy is printed. This copy of the illustration includes or excludes, if desired the Lender's data (or part of it). If it is required, the computer program causes the Lender's data to be tied in with the Borrower's data.

The program then routes through the Borrower's data and goes back to (or skips the Lender's routine if requested), and searches for a company. Either the most desirable company is determined, or a selected company and plan is selected by company code.

The computer program then proceeds to point A, and a company is selected by code. Reference may be made to the drawings illustrating Subroutine Insurance Data Compilation and the Individual Routine for Single Company Data Bank.

The information on the Borrower's File at 13, transfers the amount of the mortgage; the years certain for the mortgage; the "Conventional Current Interest Rate"; the inventive system Rate; the full name of the prospective borrower; the current address of the borrower's address of the proposed property to be mortgaged; the age of the borrower and the name and the age of other borrowers, if there are any. The file also transfers the file code of the lender and the file code of the borrower.

As indicated at FIG. 3, the information is transferred in the following order to the selected company at 317 or 318. The code number of the Borrower is sought. From this information there is determined the age of the primary borrower, the class, and smoker or non-smoker. Thereafter, the mathematics of obtaining the target amount required by iteration is performed. The monthly and subsequent annual net amount of the cash value subject to interest earnings is determined, and through iteration, at the target year, there is determined the annual and monthly premiums required to reach that goal.

As shown in FIG. 6 of the drawings, the program selects from age at 42, and selects base rate from 43-46 depending on the sex and smoker or non-smoker rate. The base rate is then multiplied by the number of 1,000's required as shown at 47. The cost of insurance at 48 is multiplied by the number of 1,000's and deducted from the base rate. The loading at 49 is multiplied by the number of 1,000's and then deducted from the base rate. The expense charges at 50 multiplied by the number of 1,000's and then deducted from the base rate. The partial surrenders at 51 are totaled, and then deducted from the gross rate. The loan amount at 52 is deducted, and multiplied by the net amount of interest charged (interest charged on loans minus the interest credited on loans at 53). Loan and net interest charges are then added, and then deducted from the base rate.

The final number is the net rate per thousand. The balance is then projected at current interestrates at 54, compounded to year certain. By iteration, present value of required annual premium is then iterated. Then, the year by year value is caused to be printed at current interest rates, and then year by year value is caused to be printed at guaranteed interest rates. The program then moves to the mortgage amortization table, and then the mortgage payments are determined by number of years at 55, and the interest rate at 56, and then the monthly payments required, the annual interest paid, and the annual cumulative interest paid by year are recorded on file. There is also shown the monthly property taxes held in escrow by the lender.

At 57, an interest factor is added to the Conventional Mortgage, and projects the outstanding principal at 58, the accumulation costs of the Cost Containment Option at 59, and the Accumulated Cash Surrender Value at 60. These factors are then multiplied by the appropriate tax factors.

The interest factors are then multiplied by the appropriate tax factors, in the 15% tax bracket the interest columns are multiplied by 0.85 and the principal is multiplied by 1.1725, in the 28% tax bracket the interest columns are multiplied by 0.72 and the principal is multiplied by 1.3584. In the 33% tax bracket, the interest is multiplied by 0.67 and the principal is multiplied by 1.489.

Having developed the statistics required to create a quotation or illustration, as indicated in FIG. 3, the program then advances to Routine Program Set 1. As indicated at 319, a decision is required "Do you want to print an illustration?" When a positive reply response, the program then picks up the information from the previous entries and structures it into an "illustration". The illustration is reviewed for accuracy, at 320, and if the illustration is correct, tee operator then "prints" the illustration at 321.

After the illustration is printed with an explanation at 322, the question is asked on delivery. Three methods of delivering the illustration to the lender may be accessed; hard copy at 323; auto dialed modem (from Lender File) at 324; or sent by facsimile reproduction at 325.

The file remains open until a response is received from the lender, or for 120 days, whichever is earlier. If no response is received in 120 days, the borrower file is purged. If a response is received from a lender, the response includes: a copy of the mortgage application; an insurance application from the Lender on the life of the borrower(s), a completed Medical Questionnaire on the part of the borrower(s); a release for financial information; and a release for medical information. The file is searched for information on "Mortgage Life Insurance," "Unemployed Borrower's Insurance," and "Disability Insurance".

The application for the mortgage is then checked against the original information on the quotation (9-1213), and then proceeds through "No" at 314 to "Do you want to upgrade lender's file." Assume the answeris "No", and the program advances to the decision point identified as, "Do you want to upgrade borrower's file" at 327. At a "Yes" prompt, the operator then enters new data from the file recording: the new mortgage principal; interest; term of the inventive mortgage loan (or other type of inventive loan), fixed or flexible; terms of loan (anniversary or flexible reviews); Borrower Mortgage Insurance at 328 (amount, premium carrier number); Disability Insurance at 329 (amount of premium, waiting period, term of coverage, amount of coverage, carrier number); and Mortgage Life Insurer at 30 (amount, length of coverage, premium, beneficiary).

This information is entered into the Borrower Data File, and proceeds then through "No" at 314, and from there to the decision point identified as, "Do you want to update lender file?" at 326. A "Yes" prompt then asks, "Do you want an annual report?" at 327B. A "No" prompt then asks, "Do you want lender information?" at 315. Assuming a "No" prompt, the program then proceeds through "No" at 317, to box 318 where the company is elected as chosen in the quotation. The new FIGS. are entered, and all the information is held as developed in the Subroutine, and then proceeds in due coarse.

The question, "Do you want to print an illustration?" at 319 is a "No prompt"and then there is prompted "Has mortgaged property changed locations?" at 327. A "No" prompt then causes the question, "Send mortgage documents" to be asked. A "Yes" prompt then causes pre- set documents by State approvals to be purchased at 329. The documents are assembled by the appropriate state, and the information held in the updated borrower file is brought through at 329, and the appropriate information is entered into the documents.

After the proper documents are collated with the appropriate details from the processed borrower's file, the question is asked, "Is truth in lending sent?". A "Yes" prompt causes the "Narrative Disclosure Document" to be prepared at 32. The decision point at 31 asks, "Prepare a hard copy?", at which point the printer is caused to prepare a completed Narrative Disclosure. A "No" prompt at 31 then asks, "Send by modem?" at 33. At a "Yes" prompt, the modem autodials the lender and send the message at 34. A "No" prompt automatically causes the autodial of the facsimile machine at 35, and the material is sent by telecopy transmission.

After the appropriate printout, the routine then returns to point identified as "Send Documents Mortgage." At the "Yes" prompt, the program advances through 29 again to point 30. At the decision prompt, "Is truth in lending sent" at 30, a "No" prompt then prepares and causes the "Truth in Lending Document" to be printed. The prompt then asks, "Do you want a hard copy?". If "Yes", a message is sent to the printer at 38. If a "No" prompt is shown, the question asks, "Do you want to send by modem?" at 39, and the system 10 activates the autodialer to the modem. If the prompt is "No", then the program automatically sends to the facsimile machine for auto transfer at 41.

Whichever routine is selected, the question point "Send documents" is returned to at 28. When the prompt is "No", the routine advances to the point identified as "Send System documents." at 43. A "No" prompt terminates the program. A "Yes" prompt then causes the program to advance to the point, "Are assignments correct?" A "No" prompt then causes the new documentation be entered on the assignments. The subroutine is shown on "F"—Assignments.

The first question the prompt asks, "Check borrower Mortgage Life Insurance" is shown at 46. At a "Yes" prompt, the amount of coverage is checked against the outstanding mortgage; the beneficiary is checked; the company is checked; and the premium is rechecked. The file also indicates the payor, and identifies the agent. The information is stored in the borrower's file at 13. A letter of confirmation to indicate that the policy is in force, is sent off-line.

After completing the cycle, the prompt asks, "Has mortgage been sold." at 53. A "No" prompt causes a return to point 46, and a "No" prompt then causes the program to advance to "Check the Borrower Disability Insurance" at 48. A "Yes" prompt then causes the checking of the waiting period; the length of coverage; the insurer; the beneficiary; the premium required; the premium payor; the monthly benefit; and the agent. The program checks the essentials such as premium, benefit and length of coverage with the mortgage payment and length of the mortgage. As shown at 13, this information is stored in the borrower's file.

After completing the cycle, the prompt then asks, "Has mortgage been sold" at 52. A "No" prompt causes the program to return to the point 46, and a "No" prompt at point 46 causes the program to return to point 48. A "No" prompt at point 48 causes the program to advance tot he point, "Check borrower's Mortgage Unemployment Insurance." A "Yes" prompt causes the amount of monthly payment; the named beneficiary; the premium amount; the payor; and the company, to be checked. There is no agent on the prompt at 51. The information is stored in the borrower's file at 13. The routine then advances to "Has the mortgage been sold." A "Yes" prompt then asks the operator to enter the new lender and the new lender's code number at 53. The program then records the system mortgage plan as a deletion from the original lender's file at 54 and adds the borrower to the new lender file at 55.

After the mortgage change is completed, the program then prompts, "Do you want to review the benefits?" at 56. A "Yes" prompt enables changes to be made in the appropriate beneficiary; amount; and other detailed changes that are required. When the amount of the mortgage changes; the interest rates; or period of the mortgage is changed, then a change in the appropriate policies is often, but not always, required.

When all changes have been made, a "Yes" prompt is effected at 56. A decision point, "Do you want to review benefits" causes the program to "Review benefits" at 57. A "No" prompt then causes the changes made to be listed, and asks the operator to prepare the letters to the agents, clients, lenders, and the like, and make the recommendations on required actions at 58. As these are not seen as repetitive because of a variety of recommendations, at 59 and 60, the material is subject to management decision, and the letters are stored off-line and are prepared manually.

At the question, "Do you want to review benefits" at 56, a "No" prompt returns to "F" and back into the "Borrower's File" where the new information is changed on the Borrower's Data File at 13, and the Lender's File (the computer program sequences through points 314, 326, 327 and 315).

When the system notes and the system documents are required, the Question at Gate at 42, "Send Mortgage Documents" is answered "Yes" Refer to E "Preparation of Documents". The prompt then asks "Is this a system" at 60. A "Yes" prompt asks "Is this A Fixed Interest Loan" at 61. A "Yes" prompt then finds and causes the retrieval of the appropriate information from the Borrower File and prepares in continuous order the documents at 62.

The first information is a System Fixed Interest Loan document. This shows the borrower assigned number; the name of the mortgagor(s); the address of the property ; legal description; interest rate; term of mortgage; date of mortgage commencement; and the date of mortgage completion. This document is filled in on the System Document.

The second document is the system mortgage plan note which: identifies the borrowers(s); interest rate; term of mortgage; beginning date of note; final date of note; property address; legal description; Cost Containment Option dates; and the Cost Containment Option amounts of each date. The program then causes the documents to be prepared, and the proper information is caused to be inserted in the appropriate spaces.

At 63, the decision point causes the question to be asked, "Do you want a hard copy". At 64, if the prompt is "Yes", the printer prepares the documents on a continuous form. If the prompt is "No", the question is asked "Send by modem". At 66, if the prompt is "Yes", then the documents are sent by modem through an automatic dial. If the answer at (65) is "No", the material is transferred through the facsimile printer and autodial at 67.

After the procedure is completed, at 68, the question is asked "Is document recorded on file". This is a check to make sure the borrower file and the lender file are correct. It will usually be redundant, and "Yes" terminates the program. "No" at this prompt takes all of the values through F to the Borrower's File at 13, and changes the values on file to the new values.

After a "Yes" prompt at "Is this system mortgage plan" at 60, the next prompt asks, "Is this a fixed loan" at 61. A "No" prompt causes the preparing of a Flexible Interest System Note and System Mortgage. This then causes the retrieval of the appropriate information from the Borrower's File, and causes the preparation in continuous order two documents at 69.

The first is a system flexible interest loan document. This document shows the assigned Borrower number;

the name of the Mortgagor(s); original interest rate; term of interest rate; term of mortgage; maximum interest rate; date of mortgage commencement; and the date of mortgage completion. The second document is the mortgage note which identifies the borrower(s); the original interest rate; the term of the original interest rate; the maximum interest rate; the term of the mortgage; beginning date of the note; final date of the note; property address; legal description; cost-containment option dates; and the cost-containment option amounts at each date.

The program then causes the preparation of the documents inserting the proper information in the appropriate space. It is then asked, "Do you want hard copy" at 71. A "Yes" prompt causes the printing of the documents in continuous form. A "No" prompt at 71 then asks "Send by Modem" at 72. A "Yes" prompt then causes the telephone number to be dialed and sends the information by auto dial. A "No" prompt at 72 then causes the sending of the information by facsimile to the lender through an auto dial system at 73.

Regardless of the transmission, the next prompt asks, "Is document recorded on file" at 74. This is a check to make sure that the borrower file and the lender files are correct. It will usually be redundant, and "Yes" terminates the program. A "No" at this prompt takes all of the values through "F" to the Borrower's File at 13 and changes the values on file to the new values. A "No" at the point 60 "Is this Mortgage System" then asks, "Is this a Tuition Mortgage" at 76.

Tuition Mortgage is an equity mortgage usually tied to an educational loan. A "Yes" prompt asks, "Is this a fixed interest loan" at 77. A "Yes" prompt then causes the retrieval of the appropriate information from the Borrower File, and prepares in continuous order two documents at 78. The first document is a System Fixed Interest Equity loan document. This document shows the Borrower's assigned Borrower number; the name of the mortgagor(s); the address of the property; the legal description; interest rate; term of mortgage; date of mortgage commencement; and the date of mortgage completion. This is filled in on the Tuition Mortgage document. The second document is the System Note which identifies the Borrower(s); interest rate; term of mortgage; beginning date of note; final date of note; property address; legal description; cost containment option dates; and the cost containment option amounts at each date. The program then causes the preparation of the documents, and inserts the correct information in the appropriate spaces. At 79, there is asked, "Do you want Hard Copy". At 80, if the prompt is "Yes", the printer causes the preparation of the documents on a continuous form. If the prompt at 79 is "No", the question is then asked, "Send by Modem" at 81 and the documents are caused to be sent to the lender's computer through automatic dial at 82. If the question at 81 is "No", then the documents are transferred through a facsimile transponder through automated dialing to the lender 83.

Regardless of the transmission, the next prompt asks, "Is document recorded on file" at 84. This is a check to make sure that the Borrower and the lender files are correct. It will usually be redundant and "Yes" terminates the program. "No" at this prompt takes all of the values through "F" to the Borrower's file at 13, and causes changes in the values on the file to the new values.

At 77, a "No" at prompt, "Is this a fixed interest," causes the preparation of the Tuition Mortgage equity loan documents. These include in a continuous program a System Mortgage note and a System Mortgage. This then causes the retrieval of the appropriate information from the Borrower's File, and causes the preparation in a continuous order two documents at 86.

The first document is the Tuition Mortgage flexible interest loan document. This shows the assigned borrower number; the name of the Mortgagor(s); the address of the property; legal description; original interest rate; term of the interest rate; maximum interest rate; term of the mortgage; date of commencement of the mortgage; and the date of the mortgage completion. The second document is the mortgage note which identifies the borrower(s); the original interest rate; the maximum interest rate; the term of the mortgage; beginning date of the note; final date of the note; property address; legal description; Cost Containment Option dates; and the Cost Containment Option amounts at each date. The program then causes the preparation of the documents, and causes the insertion of the proper information in the appropriate space.

Thereafter at 87, there is asked, "Do you want hard copy". A "Yes" prompt causes the printing of the document in continuous form. A "No" prompt at 87 then asks, "send by modem" at 88. A "Yes" prompt causes the lender's computer to be dialed for modem communication for transmission of the information at 89. A "No" prompt at 88 causes the information to be sent by facsimile to the lender through an auto-dial system at 90.

Regardless of the transmission, the next prompt asks, "Is document recorded on file" at 74. This is a check to make sure that the borrower file and the lender file are correct. It will usually be redundant and "Yes" terminates the program. "No" at this prompt takes all of these values through "F" to the Borrower's file at 13, and changes the Values on the file to the new values.

If at the prompt, "Is this Tuition Mortgage" at gate 76, the response is "No" the program then goes to Retirement Mortgage. Retirement Mortgage is a program that is used whenever an owner of a residential property desires to sell his or her property and hold the mortgage. Bridge financing is provided by a bank or other institution to a mortgage corporation, which finances the mortgage on the vendor's property through a system interest only plan. The funds thus generated are paid to the vendor.

The vendor, then invests his or her funds in a bond issued by the lender. The lender uses these funds to repay the bridge financing to the bank. The bond issued pays equal monthly installments to the Bond Holder for a period certain.

However, the first of these payments is considered to be a return of capital and are usually not taxed. The payments made after the capital return, are considered to be interest income and are fully taxable. Special documentation is stored in the service computer 12 to explain and document this program.

Thus, the next prompt "Is this a fixed interest loan" at 91. At this question being displayed, the program causes the preparation of a fixed loan System Mortgage document.

All of the borrower's files are setup as explained at 62, and the procedures follow the same sequence. However, included in the Retirement Mortgage are the documents at 92 in the Lender's File that contain different information. It shows in addition to the standard information, the name of the originating Bank; the name of the Corporation; the period of the Bond; the amount of the monthly payments; the number of the payments that are principal return; the number of payments that are interest only; the Bond Guarantor; the name of the mortgage administrator; and the administrator of the Corporation. Such information is required to prepare the annual tax returns on behalf of the Corporation for the Bond Holder. It also includes the return for the nonprofit Trust. After the fixed interest loan has been documented as explained, the prompt asks, "Do you want hard copy" at 93. A "Yes" prompt prepares all the completed documents in continuous form at 94. A "No" prompt at 93 asks, "Send by modem" at 95. A "Yes" prompt causes the dialing of the telephone number of the Lender's computer, and causes the printing of all of the documents in a continuous form, at 96. If a "No" prompt is exhibited at 95, the program causes the Lender's transponder to be dialed, and the documents are caused to be sent in that mode at 97.

Regardless of the transmission, at 98 the next prompt asks, "Is document recorded on file". This is a check to make sure that the borrower file and the lender file are correct. It will usually be redundant and "Yes" terminates the program. "No" at this prompt takes all of the values through "F" to the Borrower file at 13 and causes the values on the file to be changed to the new values.

A "Yes" prompt causes the establishment of communication with the lender's computer and causes printing of all documents in a continuous form at 96. If a "No" prompt is exhibited at 95, the program causes the dialing of the lender's facsimile transponder, and documents are then sent via facsimile at 97. Regardless of the transmission, the next prompt asks, "Is document recorded on file" at 98. This is a check for correctness of the borrower file and the lender file. It will usually be redundant and "Yes" terminates the program. "No" at this prompt takes all of the values through "F" to the Borrower's File at 13, and changes the current values to new values.

One of the features to this computer program is a constant addressing of ancillary protection programs, and changes in the ownership of the mortgage. As a mortgage passes through primary, secondary, tertiary and more owners, or mortgages, every change in title is recorded by the program.

At point 327, the prompt asks, "Has mortgaged property changed location?". At a "Yes" prompt, the new documentation is entered at point 45. A Subroutine F Assignment causes an inquiry, "Check Borrower Mortgage Life Insurance" at 100). This question should be updated annually; each time the mortgage is sold; at the time the Cost Containment Option is elected by the Borrower; and at the death of the Borrower(s). At each "Yes" prompt, the face amount of the coverage; the named insured(s); the current premium; the name and address of the premium payor (is it paid by the insured or is it paid by the bank); the named beneficiary; the assignment; and the name and address of the insurer, are checked.

If at point 100 the answer is "No", the question is asked, "Check Borrower Disability Insurance" at 102. The operator at 103 compares the current monthly interest payment, and the benefit paid by the policy. If there is a differential, the lender, the borrower and the insurer are notified, and, off line, the program is enhanced or decreased. The name and address of the premium payor (is it paid by the insured or is it paid by the bank); the named beneficiary; the assignment; and the name and address of the insurer, are updated.

The program is updated annually; each time the mortgage is sold; at the time the borrower elects the Cost Containment Option; and at a time that the administrator is notified of a disability on the part of the borrower.

The program stores the name and address of the insurer. Off line, a letter is sent annually to the insurer to obtain an annual report on the policy status. A letter is also sent to the mortgagor to remind him or her of his or her coverage and requires a report on any disability that would cause him or her to lose income. The program credits the premium when it is paid.

At 102, a "No" response then causes a prompt as follows: "Check Borrower's Mortgage Unemployment Insurance" at 104. A unique feature of the system mortgage plan, insures the borrower against missing his or her monthly interest changes and tax installments for a period up to 12 months through termination of employment. This provision is an insured program. The system 10 checks that the premium is paid and the beneficiary is current (the mortgagee). It also finds the payor of the premium and credits the premium when it is paid to the insurer.

Figure 8:
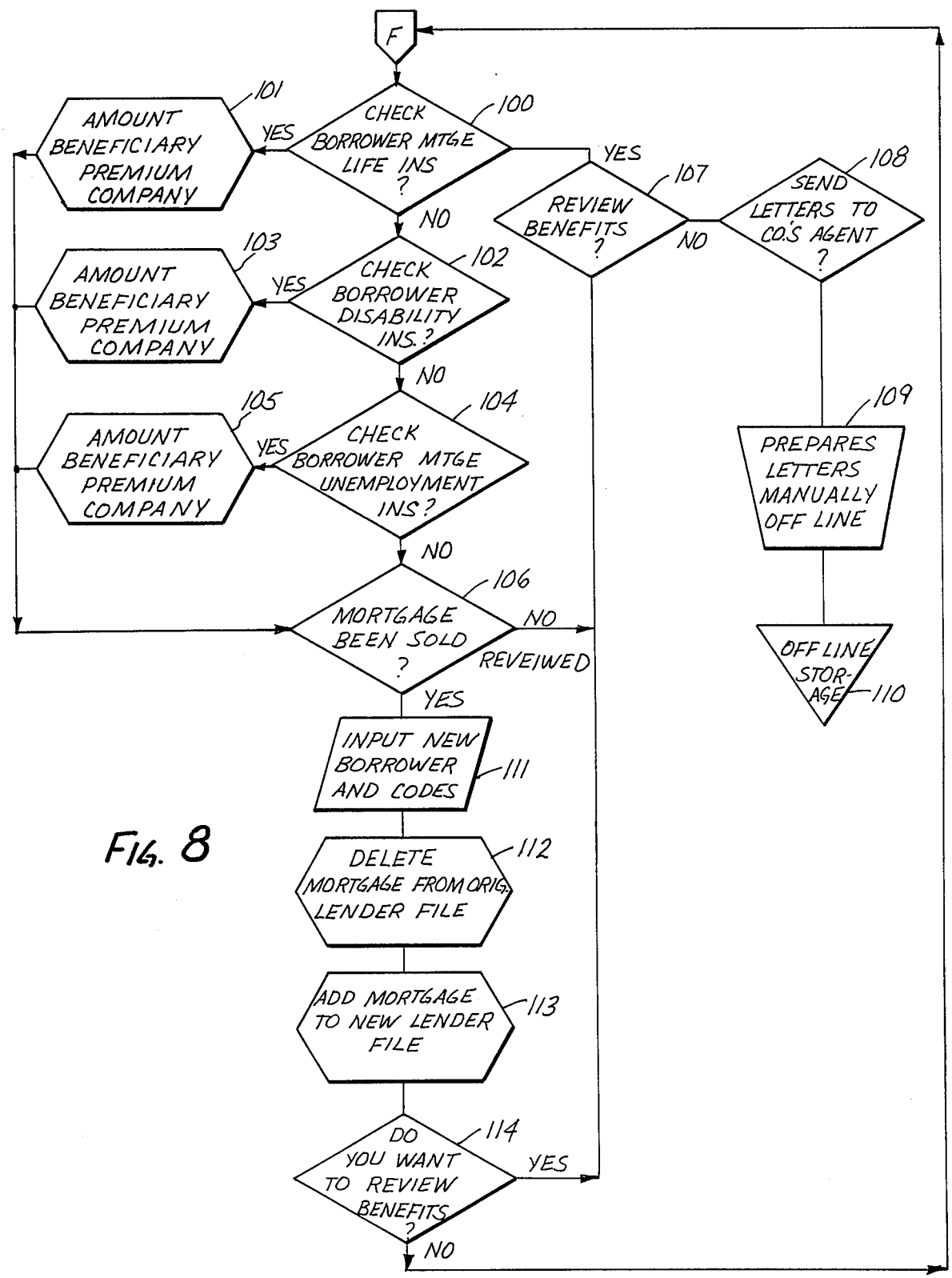
Figure 9:
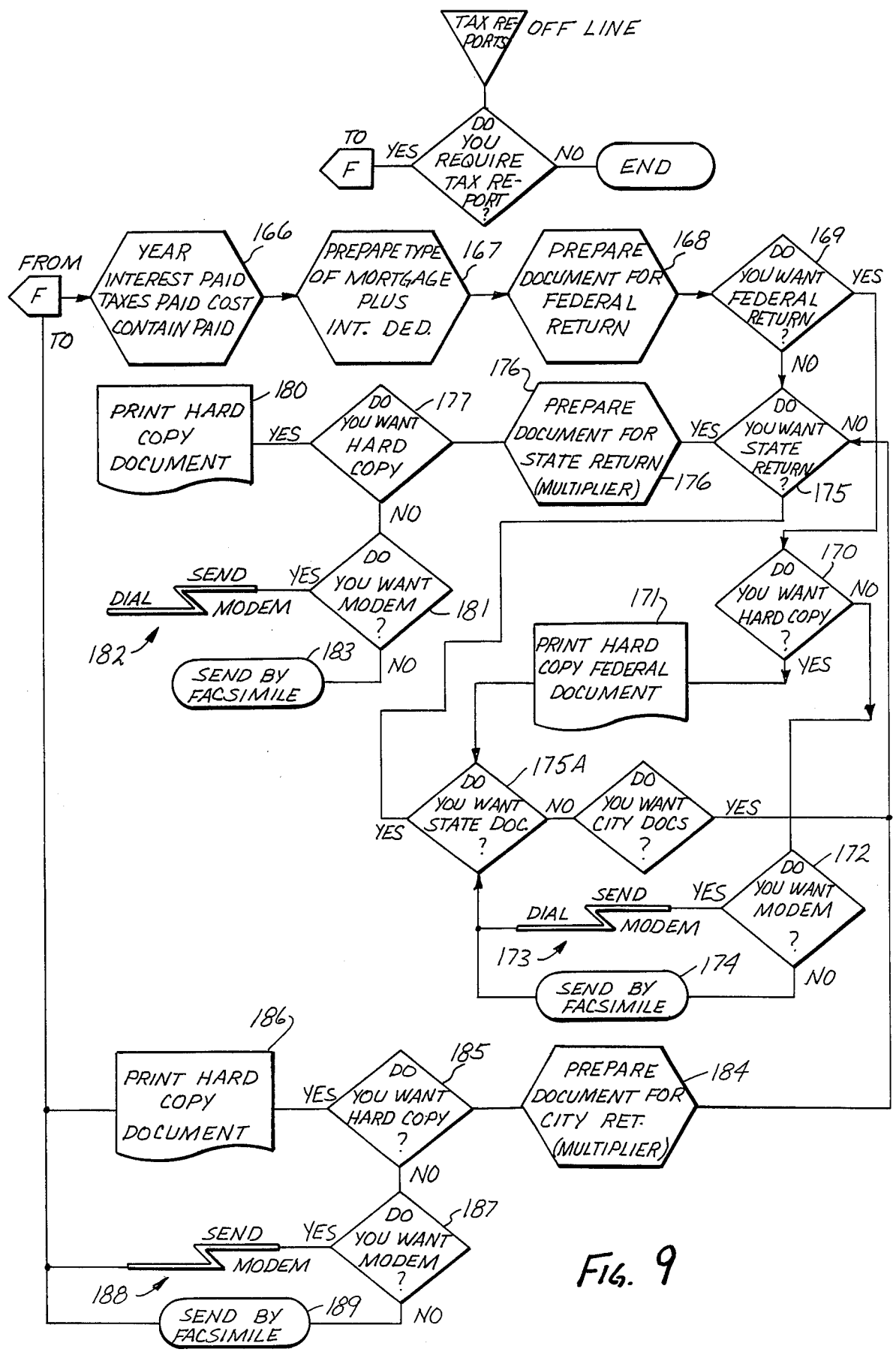

As shown in FIG. 8, after each of the routines described above at 101, 103 and 105, are completed, the prompt asks, "Has Mortgage Been Sold" at 106. A "No" prompt asks, "Review Benefits at 107. A "Yes" prompt permits the operator to go through each routine and update them by prompting "No" at each option until the correct option is reached. At prompt indicated at 107, a "No" response sets up the information from 101, 103, and 105 to be sent to the borrower; the lender; the insurer and prepares the information at 108 and 109 that is then communicated off line to each at 110. The off line documents are prepared and individually signed by the person who is required to follow up each file with each communicant.

At 106, should the operator prompt "Yes", in response to "Has Mortgage Been Sold", this immediately causes the preparation of new documentation for the "Borrower's File" at 13 and the Lender's File at 11. When the mortgage is sold, the operator assigns a new "Borrower Code" at 111. The last two digits and letter on the Borrower's file are the Lender's Code. At 112, the program then deletes the Borrower's File from the original Lender's File. This causes the amount of the mortgages held by the original lender; the amount of Cash Surrender Value in the policy supporting the system mortgage plan; and the available loan values, to be reduced. If the loan is outstanding against the policy, the buyer of the mortgage will reduce the purchase price by the outstanding loan and credit the amount to the policy.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A system for implementing a mortgage plan, comprising:
   lender computer means;

service computer means for storing borrower information and for storing groups of investment information;

said service computer means including means for receiving said borrower information and said groups of investment information;

means for selecting an individual one of said groups of investment information;

means responsive to said borrower information and to the selected one of said group of investment information for determining a desired amount of investment funding to help repay a mortgage plan structured according to the stored mortgage information; and means for generating mortgage implementing information for a given mortgage based on the determined amount of funding and for sending said mortgage implementing information to said lender computer means to facilitate the establishment of a mortgage plan.

2. A system for implementing a mortgage plan according to claim 1, further including a plurality of investment computer means corresponding individually to said groups of investment information, wherein said service computer means generates investment implementing information and sends it to a selected one of said investment computer means.

3. A system for implementing a mortgage plan according to claim 2, wherein said investment computer means sends said groups of investment information periodically to said service computer means for storage therein, so that said service computer means maintains current such information.

4. A system for implementing a mortgage plan according to claim 3, further including a plurality of lender computer means, wherein said service computer means stores groups of mortgage information corresponding to each one of said lender computer means.

5. A system for implementing a mortgage plan according to claim 4, wherein said service computer means includes means for selecting an individual one of said groups of mortgage information corresponding to a selected one of said lender computer means.

6. A system for implementing a mortgage plan according to claim 5, wherein said service computer means generates and sends mortgage maintenance information periodically to one of said lender computer means to help facilitate the mortgage plan.

7. A system for implementing a mortgage plan according to claim 6, wherein said service computer means includes means for generating and sending investment maintenance information periodically to one of said investment computer means to help facilitate the investment fund portion of the mortgage plan.

8. A system for implementing a mortgage plan according to claim 7, wherein said investment information is interest sensitive life insurance information, and said means for determining a desired amount of investment funding, includes means for determining an insurance premium payment including an investment portion corresponding to the desired amount of investment funding.

9. A system for implementing a mortgage plan according to claim 8, wherein said means for determining an insurance premium payment calculates said insurance premium iteratively according to the following formula:

$$E=[A+F-(B\times C)]\times(1+D), \text{ until } E=M+XM,$$

where
A = annual insurance premium
B = annual risk portion per $1,000
C = mortgage amount divided by $1,000,
D = elected interest rate,
E 32 accumulated investment fund portion, and
F = E for previous year
M = amount of the mortgage
X = fixed percentage.

10. A system for implementing a mortgage plan according to claim 1, wherein said computer means comprises:
a service computer;
a service terminal for entering selected condormation in said service computer; and
a service printer for producing reports and other document information relating to the mortgage plan;
said service terminal including service data communication means for communication mortgage plan information to said lender computer means.

11. A system for implementing a mortgage plan according to claim 10, wherein said service data communication means is a modem.

12. A system for implementing a mortgage plan according to claim 1 wherein said lender computer means comprises:
a lender computer;
a lender terminal for communication borrower information to said lender computer;
a lender printer for printing mortgage plan information generated by said service computer;
said borrower information including the amount of loan required by the borrower, and other personal information regarding the borrower; and
said lender terminal including lender data communication means for transferring the customer information and the lender information to said service computer means.

13. A system for implementing a mortgage plan according to claim 12 wherein said lender data communication means is a modem.

14. A method of implementing a mortgage plan, comprising:
using lender computer means;
receiving and storing borrower information and groups of investment information;
selecting an individual one of said groups of investment information;
responding to said borrower information and to the selected one of said group of investment information for determining a desired amount of investment funding to help repay a mortgage plan structured according to the stored mortgage information; and
generating mortgage implementing information for a given mortgage based on the determined amount of funding and for sending said mortgage implementing information to said lender computer means to facilitate the establishment of a mortgage plan. said lender computer means to facilitate the establishment of a mortgage plan.

15. A method according to claim 14, further including using a plurality of investment computer means corresponding individually to said groups of investment information, and generating investment implementing information and sends it to a selected one of said investment computer means.

16. A method according to claim 15, further including storing periodically said groups of investment information.

17. A method according to claim 16, further including a plurality of lender computer means, and storing groups of mortgage information corresponding to each one of said lender computer means.

18. A method according to claim 17, further including selecting an individual one of said groups of mortgage information corresponding to a selected one of said lender computer means.

19. A method according to claim 18, further including generating and sending mortgage maintenance information periodically to one of said lender computer means to help facilitate the mortgage plan.

20. A method according to claim 19, further including generating and sending investment maintenance information periodically to one of said investment computer means to help facilitate the investment fund portion of the mortgage plan.

21. A method according to claim 14, wherein said investment information is interest sensitive life insurance information, and further including determining an insurance premium. payment including an investment portion corresponding to the desired amount of investment funding.

22. A system for implementing a mortgage plan, comprising:
means for storing mortgage information indicative of a mortgage forming a part of the mortgage plan, said information includes a mortgage dollar amount, a mortgage term period, and a mortgage interest rate;
means for gathering periodically current rate of return information regarding a predetermined investment;
means for updating stored return information periodically;
means for retrieving current updated return information for helping establish a given mortgage plan;
means for gathering personal borrower information for a given borrower;
means for storing said borrower information;
means for retrieving said borrower information to help establish the given mortgage plan
means for determining a periodic investment contribution amount to achieve a total return on said investment over the term period of said mortgage based on the current rate of return on the predetermined investment to help repay the mortgage at the termination thereof;
means for determining a periodic mortgage interest payment amount for facilitating the calculation of periodic mortgage payment amounts each including a periodic investment contribution amount and a periodic mortgage interest payment amount;
means for calculating the mortgage payment amounts for repaying the mortgage plan; and
means for generating projections reports indicative of the mortgage plan, mortgage documents to implement the mortgage plan based on said periodic mortgage payment amounts and said mortgage information, and update reports periodically for maintaining the implemented mortgage plan.

23. A system for implementing a mortgage plan according to claim 22, wherein the total return on the investment is at least equal to the mortgage dollar amount.

24. A system for implementing a mortgage plan according to claim 22, wherein the total return on the investment is greater than the mortgage dollar amount by a certain percentage.

25. A system for implementing a mortgage plan according to claim 24, wherein said percentage is about ten percent.

26. A system for implementing a mortgage plan according to claim 22, wherein said predetermined investment is an insurance policy including an investment portion, said investment portion being a cash surrender value which is interest sensitive.

27. A system for implementing a mortgage plan according to claim 26, further comprising:
means for storing investment information indicative of the perdetermined investment forming a part of a mortgage plan;
means for receiving and storing borrower information;
means responsive to the borrower information and to the investment information for determining contribution amounts for investment funds to help repay mortgage plans structured according to the stored mortgage information;
wherein said means for determining said
contribution amounts stores signals indicative of an algorithm for facilitating the calculation of mortgage payment amounts each including an investment contribution amount, for repaying mortgage plans.

28. A system for implementing a mortgage plan according to claim 27, wherein said means for storing investment information includes means for storing a plurality of groups of interest sensitive life insurance information, and further including means for selecting an individual one of said groups of life insurance information.

29. A system for implementing a mortgage plan according to claim 28, wherein said means for storing mortgage information includes mean for storing a plurality of groups of mortgage information corresponding to different ones of mortgages.

30. A system for implementing a mortgage plan according to claim 27, wherein said means for determining said contribution amounts responds to the algorithm signals for generating signals indicative of mortgage payment amounts including periodic investment contribution amounts and periodic mortgage interest payment amounts, for repaying mortgage plans.

31. A system for implementing a mortgage plan according to claim 30 wherein said means for determining includes computer means for selecting the stored borrower information an mortgage information for generating mortgage implementing information to help facilitate the establishment of a mortgage plan.

32. A system for implementing a mortgage plan according to claim 31 wherein said computer means includes terminal means for inputting the mortgage information and the investment information.

33. A system for implementing a mortgage plan according to claim 32 where in said computer means further includes printing means for producing reports to facilitate the establishment and administration of mortgage plans.

34. A system for implementing a mortgage plan according to claim 33, wherein said computer means further includes storage means for storing the generated mortgage implementing information.

35. A system for implementing a mortgage plan according to claim 34, further comprising:
data computer means responsive to said stored mortgage implementation information for determining a desired amount of investment funding to help repay a mortgage plan structured according to the stored mortgage information.

36. A system for implementing a mortgage plan according to claim 35, wherein said data computer means includes means for calculating iteratively a desired amount of investment funding to help repay a mortgage plan structured according to the stored mortgage information, said funding being based upon a given annual investment amount from a borrower for a given interval of time as related to a specific amount of mortgage at an elected interest rate.

37. A system for implementing a mortgage plan according to claim 36, wherein said means for calculating iteratively includes an algorithm for facilitating the iterative calculation based on the following formula:

$$E=[A+F-(B\times C)]\times(1+D), \text{ until } E=M+XM,$$

where
A = annual insurance premium,
B = annual risk portion per $1,000
C = mortgage amount divided by $1,000
D = elected interest rate,
E = accumulated investment fund portion, and
F = E for previous year.
M = amount of mortgage
X = fixed percentage.

38. A system for implementing a mortgage plan according to claim 37, further including:
means for monitoring the status of the mortgage plan during the term of the mortgage plan;
said means for monitoring including update means for updating the borrower information, the investment information, and the mortgage information, to facilitate the administration of the mortgage plan;
said means for monitoring further including means for generating administration reports for use by the mortgage plan participates.

39. A system for implementing a mortgage plan according to claim 35, wherein said data computer means responds to said algorithm signals for generating signals indicative of tentative amount of investment funding.

40. A system for implementing a mortgage plan according to claim 39, wherein said data computer means responds to the tentative amount of investment funding and to said algorithm signals for generating further tentative amount of investment funding signals.

41. A system for implementing a mortgage plan according to claim 40, wherein said data computer means stores signals indicative of a desired amount of investment funding that includes a specific amount of mortgage and a fixed percentage of said specific amount of mortgage for a given mortgage plan.

42. A system for implementing a mortgage plan according to claim 41, wherein said data computer means responds to said desired amount of investment funding and to said tentative amount of investment funding signals for comparing the equivalence of the stored desired amount of investment funding signals with the tentative amount of investment funding signals and for generating a report in response to an equivalence, and alternatively for initiating further calculation operations in response to a non-equivalence.

43. A system for implementing a mortgage plan according to claim 33, wherein said printing means is a line printer.

* * * * *

UNITED STATES PATENT AND TRADEMARK OFFICE
CERTIFICATE OF CORRECTION

PATENT NO. : 4,876,648
DATED : October 24, 1989
INVENTOR(S) : Clarke B. Lloyd

It is certified that error appears in the above-identified patent and that said Letters Patent is hereby corrected as shown below:

Column 3, line 63, after "plan.", insert --Therefore, computer programs need be acquired, and no expensive updates are required by the lending institution. As a result, substantial cost savings can be passed along to the borrower.--.

Column 5, line 45, after "computer 12," delete "Wherein", and substitute therefor --wherein--.

Column 10, line 44, after "in the", insert --event of the death of the borrower. The lender continues to have a mortgage on the property.--.

Table 1, Column 5, entitled "Annual After Tax Cost", Year 20: Delete "10,342.2", and substitute therefor --10,342.25--.

Column 17, line 6, after "than a", insert --conventional mortgage. Also, the borrower has total--.

Column 20, line 35, after "$1,000 =" delete to the end of the line, and substitute therefor --M/1000--.

Column 21, line 31, delete "Year", and substitute therefor --year--.

Column 21, line 52, after "1.095=", delete "79.62", and substitute therefor --14,979.62--.

Column 24, line 27, after "he or", delete "the" and substitute therefor --she--.

Column 27, line 18, after "payments.", delete ";".

Column 27, line 52, after "monthly", insert --)--.

UNITED STATES PATENT AND TRADEMARK OFFICE
CERTIFICATE OF CORRECTION

PATENT NO. : 4,876,648

DATED : October 24, 1989

INVENTOR(S) : Clarke B. Lloyd

It is certified that error appears in the above-identified patent and that said Letters Patent is hereby corrected as shown below:

Column 28, line 24, after "each", insert --borrower,--.

Column 29, line 34, delete "interestrates", and substitute therefor --interest rates--.

Column 29, line 65, after "reply", insert --is the--.

Column 30, line 1, before "operator", delete "tee", and substitute therefor --the--.

Column 30, line 22, before ", and then", delete "(9-1213)", and substitute therefor --(9-12-13)--.

Column 30, line 24, before "No", delete "answeris", and substitute therefor --answer is--.

Column 30, line 46, after "new", delete "FIGS.", and substitute therefor --figures--.

Column 32, line 22, after "Yes", insert --.--.

Column 38, line 16, after "selected", delete "condormation" and substitute therefor --conformation--.

Column 38, lines 62 to 64, after "plan.", delete "said lender computer means to facilitate the establishment of a mortgage plan."

Column 39, line 26, after "premium", delete ".".

UNITED STATES PATENT AND TRADEMARK OFFICE
CERTIFICATE OF CORRECTION

PATENT NO. : 4,876,648

DATED : October 24, 1989

INVENTOR(S) : Clarke B. Lloyd

It is certified that error appears in the above-identified patent and that said Letters Patent is hereby corrected as shown below:

Column 39, line 47, after "plan", insert ";".

Column 40, line 18, delete "perdetermined", and substitute therefor --predetermined--.

Signed and Sealed this

Fourth Day of June, 1991

*Attest:*

HARRY F. MANBECK, JR.

*Attesting Officer*     *Commissioner of Patents and Trademarks*